United States Patent
Berg et al.

(10) Patent No.: US 12,247,830 B2
(45) Date of Patent: Mar. 11, 2025

(54) RELATIVE MODE TRANSMISSION LOSS MEASUREMENT OF A CONNECTORIZED FIBER OPTIC CABLE

(71) Applicant: CORNING RESEARCH & DEVELOPMENT CORPORATION, Corning, NY (US)

(72) Inventors: David Matthew Berg, Rochester, NY (US); Stefan Wolfgang Kramel, Regensburg (DE); David Andrew Pastel, Horseheads, NY (US); Michael Brian Webb, Lindley, NY (US)

(73) Assignee: Corning Research & Development Corporation, Corning, NY (US)

( * ) Notice: Subject to any disclaimer, the term of this patent is extended or adjusted under 35 U.S.C. 154(b) by 262 days.

(21) Appl. No.: 17/952,399

(22) Filed: Sep. 26, 2022

(65) Prior Publication Data

US 2023/0095762 A1    Mar. 30, 2023

Related U.S. Application Data

(60) Provisional application No. 63/249,641, filed on Sep. 29, 2021.

(51) Int. Cl.
*G02B 6/38*        (2006.01)
*G01B 11/27*      (2006.01)
*G01M 11/00*     (2006.01)

(52) U.S. Cl.
CPC ............. *G01B 11/27* (2013.01); *G01M 11/33* (2013.01); *G02B 6/3821* (2013.01); *G02B 6/3825* (2013.01); *G02B 6/3877* (2013.01)

(58) Field of Classification Search
CPC .................................................... G01M 11/33
See application file for complete search history.

(56) References Cited

U.S. PATENT DOCUMENTS

| | | | |
|---|---|---|---|
| 4,090,793 | A | 5/1978 | Lebduska et al. |
| 4,309,105 | A | 1/1982 | Lebduska |
| 4,767,207 | A | 8/1988 | Takiguchi |

(Continued)

FOREIGN PATENT DOCUMENTS

| | | |
|---|---|---|
| CN | 210268895 U | 4/2020 |
| CN | 111238640 A | 6/2020 |

(Continued)

OTHER PUBLICATIONS

International Search Report and Written Opinion of the International Searching Authority; PCT/US22/44173; mailed on Jan. 19, 2023, 12 pages; European Patent Office.

*Primary Examiner* — Charlie Y Peng
(74) *Attorney, Agent, or Firm* — Adam R. Weeks

(57) ABSTRACT

A method and system for measuring signal loss in a fiber optic cable. The tail ends of reference and test fiber optic cables are illuminated with a diffuse light. The head end of each of the reference and test fiber optic cables are positioned in a measurement area. A core imager captures an image of the core of each head-end while it is in the measurement area. Reference and test radiant fluxes emitted from the reference and test head-ends are determined from the respective core images. The relative signal loss of the test fiber optic cable is then determined by comparing the test radiant flux to the reference radiant flux.

18 Claims, 15 Drawing Sheets

(56) References Cited

U.S. PATENT DOCUMENTS

| | | | |
|---|---|---|---|
| 4,994,679 A | | 2/1991 | Esser et al. |
| 5,657,131 A | | 8/1997 | Csipkes et al. |
| 5,671,049 A | | 9/1997 | Csipkes et al. |
| 5,729,622 A | | 3/1998 | Csipkes et al. |
| 5,768,401 A | | 6/1998 | Csipkes et al. |
| 5,768,409 A | | 6/1998 | Csipkes et al. |
| 5,854,852 A | | 12/1998 | Csipkes et al. |
| 5,862,250 A | | 1/1999 | Csipkes et al. |
| 5,878,159 A | * | 3/1999 | Taleblou .......... G06T 5/90 382/128 |
| 6,011,616 A | * | 1/2000 | Volcy ............ G02B 6/3807 356/73.1 |
| 7,079,743 B2 | * | 7/2006 | Lauzier ............ G01M 11/31 356/73.1 |
| 7,801,405 B2 | * | 9/2010 | Daum ............ G02B 6/4298 385/115 |
| 9,442,005 B2 | | 9/2016 | Fusco et al. |
| 9,612,177 B2 | | 4/2017 | Clarke et al. |
| 10,185,096 B2 | | 1/2019 | Clarke et al. |
| 2016/0033325 A1 | * | 2/2016 | Fusco ............ H04B 10/0795 356/73.1 |
| 2017/0322111 A1 | | 11/2017 | Schell et al. |
| 2018/0266918 A1 | | 9/2018 | Schell et al. |
| 2020/0249121 A1 | * | 8/2020 | He .............. G01M 11/33 |

FOREIGN PATENT DOCUMENTS

| | | |
|---|---|---|
| EP | 0757227 A2 | 2/1997 |
| EP | 3389198 A1 | 10/2018 |
| JP | 63-285441 A | 11/1988 |
| JP | 63-311139 A | 12/1988 |
| JP | 2010-243729 A | 10/2010 |
| WO | 2016/033139 A1 | 3/2016 |

* cited by examiner

RELATIVE MODE TRANSMISSION LOSS MEASUREMENT OF A CONNECTORIZED FIBER OPTIC CABLE

PRIORITY APPLICATION

This application claims the benefit of priority of U.S. Provisional Application No. 63/249,641, filed on Sep. 29, 2021, the content of which is relied upon and incorporated herein by reference in its entirety.

TECHNICAL FIELD

This disclosure relates generally to optical connectivity, and more particularly to a method for measuring signal loss in a connectorized fiber optic cable.

BACKGROUND

Optical fibers are useful in a wide variety of applications, including the telecommunications industry for voice, video, and data transmissions. Benefits of optical fibers include wide bandwidth and low noise operation. In a telecommunications system that uses optical fibers, there are typically many locations where fiber optic cables containing the optical fibers connect to equipment or other fiber optic cables, To conveniently provide these connections, fiber optic connectors are often provided on the ends of fiber optic cables to non-permanently connect and disconnect optical elements in the fiber optic network.

One negative consequence of using connectorized fiber optic cables is the introduction of an insertion loss across the optical connection, e.g., at the junction between optical fibers. One common optical connection in a network is one between two mated fiber optic connectors, such as within an adapter. It should be recognized, however, that the term "optical connection" may encompass other types of junctions between optical fibers. The insertion losses in coupling two optical fibers across an optical connection are generally a function of the alignment of the optical fiber ends, the width of the gap between the ends, and the optical surface condition at the ends. To minimize insertion losses, processes have been developed for reducing misalignments of the optical fibers across the optical connection.

FIGS. 1 and 2 illustrate an exemplary fiber optic connector 10 shown terminating a fiber optic cable 12 typical of that which may be found in fiber optic networks. Although the connector 10 is shown in the form of a SC-type connector (e.g., according to IEC 61754-20: 2012), the depicted features may be applicable to different connector designs, such as LC-type connectors (e.g., according to IEC 61754-4: 2013), or any other single-fiber or multi-fiber connector design. As shown in FIGS. 1 and 2, the connector 10 includes a ferrule 14 having at least one ferrule bore 16 ("micro-bore" or "micro-hole") configured to support an optical fiber 18 provided by the fiber optic cable 12, an end-face 20, and a cylindrically shaped outer surface 22 that defines a longitudinal center axis 24 of the ferrule 14, Although the exemplary ferrule 14 has a single ferrule bore 16, it should be understood that fiber optic connectors may also be configured to optically couple more than one optical fiber, and may therefore include ferrules with multiple ferrule bores. Furthermore, it should be understood that the end-face 20 of the ferrule 14 may be shaped (e.g., polished) to have any desired geometry, such as those associated with Ultra Physical Contact (UPC) connectors or Angled Physical Connect (APC) connectors.

The connector 10 further includes a connector housing 25 having a cavity 26 configured to receive a ferrule holder 27 from which the ferrule 14 extends, and a connector body 28 configured to cooperate with the connector housing 25 to retain the ferrule 14 and ferrule holder 27 within the connector housing 25. The ferrule holder 27 may be biased to an extended position within the connector housing 25 by a spring 29 that extends over a rear portion of the ferrule holder 27. The ferrule holder 27, connector body 28, and spring 29 may interact with the internal geometry of the connector housing 25 to allow the ferrule 14 to move axially within a range of motion along longitudinal center axis 24.

The end-face 20 of ferrule 14 may project beyond a front end of the connector housing 25, and present the optical fiber 18 for optical coupling with a mating component, e.g., another fiber optic connector (not shown). The ferrules 14 of two fiber optic connectors 10 may be coupled to each other using a mating sleeve or other adapter that aligns the ferrules 14. Thus, when the connector 10 is mated with the other component, the optical fiber(s) in the ferrule 14 may be held in alignment with the optical fiber(s) of the mating ferrule to establish an optical connection.

At optical connections between fiber optic connectors, light exiting each optical fiber of one fiber optic connector (e.g., of one fiber optic cable) is introduced into a corresponding optical fiber within an adjacent fiber optic connector (e.g., of the other fiber optic cable). FIGS. 3 and 3A are schematic illustrations of an end-face view of an exemplary fiber optic connector, such as the connector 10 of FIGS. 1 and 2. Bare optical fibers typically include a core 30 through which the light travels, and a cladding 32 configured to form a waveguide and minimize transmission losses through the optical fiber 18. If the optical fiber cores 30 at an interconnection between optical fibers 18 are misaligned, then transmission of an optical signal from one optical fiber 18 to the other optical fiber 18 may be inhibited, resulting in signal degradation at the interconnection. The optical fiber cores 30 must therefore be closely aligned to minimize insertion loss at optical connection points.

To facilitate accurate alignment between optical fiber cores 30, it is advantageous to know connector attributes such as the offset between the micro-bore 16 and the center axis 24 of each ferrule 14 being coupled. These attributes may include, for example, the eccentricity and angle of a geometric center 34 of micro-bore 16 relative to a geometric center 36 of ferrule 14 at the end-face 20. In this disclosure, the center axis 24 is assumed to extend through the geometric center 36 of ferrule 14. FIGS. 3 and 3A depict this offset in an exaggerated manner to simplify the illustrations. As shown in FIGS. 3 and 3A, the center axis 24 represents a center of the ferrule 14 that is based on the profile of the ferrule's outer surface 22. For discussion purposes, a coordinate system may be positioned at the center of the ferrule 14 that defines orthogonal axes x and y, e.g., a Cartesian coordinate system. As explained above, the micro-bore 16 is configured to support the optical fiber 18. Ideally, each micro-bore 16 would be located such that the center 34 of micro-bore 16 coincides with the center axis 24 of ferrule 14, and, therefore, the center 36 of ferrule 14 at the end-face 20. However, due to inherent tolerance variations in the materials and manufacturing processes, the centers 34 of micro-bores 16 are typically offset from the ferrule center axis 24 by some amount. That is, there is typically an error in concentricity, resulting in micro-bore-to-ferrule eccentricity.

The optical fiber 18 is configured to be positioned in the micro-bore 16 and secured within the micro-bore 16 using a suitable adhesive or bonding agent 38. The micro-bore 16 is typically oversized relative to the optical fiber 18. This can result in a geometric center 40 of optical fiber 18 being offset from the center 34 of micro-bore 16 by some amount, referred to as the fiber-to-micro-bore eccentricity. Moreover, due to inherent tolerance variations in the materials and processes used to manufacture the optical fiber 18, a geometric center 42 of the core 30 of optical fiber 18 is typically offset from the center 40 of optical fiber 18 (which is defined by the outer surface of the cladding 32) by some amount. Thus, there is also typically a fiber core-to-cladding eccentricity.

One challenge for reducing insertion losses is to locate the center 42 of the core 30 of optical fiber 18 as close as possible to the center axis 24 of ferrule 14 given the variations present in current materials and manufacturing techniques. In many cases, the center axis 24 operates as the mating location of the ferrule 14, and losses may be reduced by minimizing the offset between the center 42 of the core 30 of optical fiber 18 and the center axis 24 at the end-face 20 of the ferrule 14. This offset is referred to as the core-to-ferrule offset, and indicates the deviation in the position of the core 30 of optical fiber 18 from its optimal position, i.e., aligned with the center axis 24 of ferrule 14.

Although core misalignments account for many excessive transmission loss scenarios, a defect in the fiber optic cable, such as fiber core or cladding damage and connector defects, can also lead to excessive attenuation. However, these types of defects are typically difficult to detect. In particular, certain causes of transmission loss (such as losses due to microbends in the optical fiber 18) may only occur when the ferrule 14 is retracted relative to the connector housing 25. Moreover, insertion losses due to small variations in the location of the core 30 make detection of transmission losses due to other issues in the fiber optic cable 12 difficult. In particular, the relatively large magnitude and variance of insertion losses resulting from small misalignments tends to conceal smaller transmission losses caused by problems in the optical fiber itself.

Thus, there is a need in the fiber optic industry for improved methods of determining transmission losses in fiber optic cables. More particularly, there is a need for methods of accurately determining transmission losses that are insensitive to positioning of the core, or core misalignments, in connectorized fiber optic cables.

SUMMARY

In an embodiment, an improved method of measuring signal loss in a fiber optic cable is disclosed. The method includes positioning a reference head-end of a reference fiber optic cable in a measurement region, illuminating a reference tail-end of the reference fiber optic cable with a diffuse light, and determining a reference radiant flux being emitted from the reference head-end of the reference fiber optic cable. The method further includes positioning a test head-end of a test fiber optic cable in the measurement region, illuminating a test tail-end of the test fiber optic cable with the diffuse light, determining a test radiant flux emitted from the test head-end of the test fiber optic cable, and determining a signal loss of the test fiber optic cable by comparing the test radiant flux to the reference radiant flux.

In an aspect of the disclosed method, positioning a respective one of the reference head-end and the test head-end (such that either the reference head-end or the test head-end may be referred to as a "respective head-end") may include capturing a plurality of profile images of a ferrule of the respective head-end in which each profile image includes an image element corresponding to an outer surface of the ferrule, and positioning the respective head-end so that the image element in each of the plurality of profile images aligns with a fiducial marker associated with the profile image.

In another aspect of the disclosed method, illuminating the reference tail-end and the test tail-end may include emitting light into an integrating chamber that has an inner surface. The inner surface may include a first target area and a second target area offset from the first target area. The light may be emitted toward the first target area, and the method may further include aiming the reference tail-end of the reference fiber optic cable and the test tail-end of the test fiber optic cable toward the second target area.

In another aspect of the disclosed method, the method may further include aiming a power monitor tail-end of a power monitor fiber optic cable toward the second target area, illuminating the power monitor tail-end of the power monitor fiber optic cable with the diffuse light, determining a power monitor radiant flux emitted from a power monitor head-end of the power monitor fiber optic cable, and normalizing at least one of the test radiant flux and the reference radiant flux based on the power monitor radiant flux.

In another aspect of the disclosed method, the light emitted into the integrating chamber may include a plurality of wavelengths.

In another aspect of the disclosed method, the light emitted into the integrating chamber may be provided by a laser including a single mode having a dithered phase, a plurality of modes having non-dithered phases, or a plurality of modes having dithered phases.

In another aspect of the disclosed method, measuring the reference radiant flux and the test radiant flux may include capturing a core image of a respective head-end of the reference or the test fiber optic cables that includes an image element associated with a core of the respective fiber optic cable, and determining the respective radiant flux based on the image element.

In another aspect of the disclosed method, the image element may include one or more pixels each having a pixel value proportional to a radiance of a portion of the core associated with the pixel, and determining the respective radiant flux based on the image element may include summing the one or more pixel values.

In another aspect of the disclosed method, determining the respective radiant flux based on the image element may include fitting a Gaussian curve to the one or more pixel values and computing an area under the Gaussian curve.

In another aspect of the disclosed method, comparing the test radiant flux to the reference radiant flux may include dividing the test radiant flux by the reference radiant flux.

In another aspect of the disclosed method, the test head-end comprises a fiber optic connector that includes a ferrule and a connector housing that receives the ferrule, and the ferrule is biased relative to the connector housing to an extended position. The method may further include compressing the ferrule of the test head-end of the test fiber optic cable relative to the connector housing so that the ferrule is in a retracted position, and determining the test radiant flux emitted from the test head-end while the ferrule is in the retracted position.

In another aspect of the disclosed method, the method may further include comparing the test radiant flux emitted from the test head-end while the ferrule is in the retracted position to the test radiant flux emitted from the test head-end while the ferrule is in an extended position, and determining a defect exists in the test fiber optic cable if a difference in the test radiant flux between the retracted position and the extended position exceeds a predetermined threshold.

In another embodiment, an improved system for measuring signal loss in the test fiber optic cable is disclosed. The system includes the reference fiber optic cable having the reference tail-end and the reference head-end, the diffuse light source configured to provide the diffuse light to the reference tail-end of the reference fiber optic cable and to the test tail-end of the test fiber optic cable, a core imager configured to capture a reference core image of the reference head-end and a test core image of the test head-end, one or more processors in communication with the core imager, and a memory coupled to the one or more processors that has program code. When executed by the one or more processors, the program code stored in the memory causes the system to determine the reference radiant flux emitted by the reference head-end based on the reference core image, determine the test radiant flux emitted by the test head-end based on the test core image, and determine the signal loss of the test fiber optic cable by comparing the test radiant flux to the reference radiant flux.

In another aspect of the disclosed system, the system may further include a plurality of apex imagers and a positioner each in communication with the one or more processors. The apex imagers may be arranged so that each apex imager captures a profile image from a different angle around a measurement region. The program code may further cause the system to, for each of the reference and the test head-ends, capture the plurality of profile images of the ferrule of the respective head-end, each profile image of the plurality of profile images including the image element corresponding to the outer surface of the ferrule, and position the respective head-end so that the image element in each profile image of the plurality of profile images aligns with the fiducial marker associated with the profile image.

In another aspect of the disclosed system, the diffuse light source may include the integrating chamber having the inner surface with the first target area and the second target area offset from the first target area, the illuminant that emits light toward the first target area, and an output port assembly. The output port assembly may be configured to receive the reference head-end of the reference fiber optic cable and the test head-end of the test fiber optic cable, and orient the reference and test head-ends so that they are each aimed at the second target area.

In another aspect of the disclosed system, the system may further include a power monitor in communication with the one or more processors, and the power monitor fiber optic cable that includes the power monitor head-end and the power monitor tail-end and that operatively couples the power monitor to the integrating chamber. The output port assembly may be further configured to orient the power monitor tail-end so that it is aimed at the second target area, and the program code may further cause the system to determine the power monitor radiant flux emitted from the power monitor head-end, and normalize at least one of the test radiant flux and the reference radiant flux based on the power monitor radiant flux.

In another aspect of the disclosed system, the illuminant may include the laser having the single mode with the dithered phase, the plurality of modes with the non-dithered phases, or the plurality of modes with the dithered phases.

In another aspect of the disclosed system, the output port assembly may include a first receiver assembly configured to receive one of the reference head-end of the reference fiber optic cable or the test head-end of the test fiber optic cable, a second receiver assembly configured to receive the other of the reference head-end or the test head-end, and a port adapter operatively coupled to the integrating chamber and having a first receptacle and a second receptacle each configured to receive the first or second receiver assembly.

In another aspect of the disclosed system, each of the first receiver assembly and the second receiver assembly may include a receiver body configured to receive a respective head-end of the reference fiber optic cable or the test fiber optic cable, and a compression cap that is operatively coupled to the receiver body by a retaining bolt. The compression cap may be configured to compress the ferrule of the respective head-end in response to the retaining bolt being tightened.

In another aspect of the disclosed system, one or more of the receiver bodies may include a flange having a magnet, and one or more of the first and second receptacles of the port adapter may include a stop face configured to engage the flange of the receiver body and that is attracted to the magnet.

In another aspect of the disclosed system, the inner surface of the integrating chamber may include a fluorescent material that emits light over a continuum of wavelengths, and the light emitted by the illuminant may have a wavelength that is outside the continuum of wavelengths emitted by the fluorescent material and that excites the fluorescent material.

In another aspect of the disclosed system, the program code may cause the system to measure a respective one of the reference radiant flux and the test radiant flux by capturing the core image having the image element associated with the core of the respective head-end, and determine the respective radiant flux based on the image element.

In another aspect of the disclosed system, the image element may include the one or more pixels each having the pixel value proportional to the radiance of the portion of the core associated with the pixel, and the program code may cause the system to determine the respective radiant flux based on the image element by summing the one or more pixel values.

In another aspect of the disclosed system, the program code may cause the system to determine the respective radiant flux based on the image element by fitting the Gaussian curve to the one or more pixel values and computing an area under the Gaussian curve.

In another aspect of the disclosed system, the program code may cause the system to compare the test radiant flux to the reference radiant flux by dividing the test radiant flux by the reference radiant flux.

BRIEF DESCRIPTION OF THE DRAWINGS

The accompanying drawings are included to provide a further understanding and are incorporated in and constitute a part of this specification. The drawings illustrate one or more embodiment(s), and together with the description serve to explain principles and operation of the various embodiments, Features and attributes associated with any of the embodiments shown or described may be applied to other embodiments shown; described, or appreciated based on this disclosure.

DETAILED DESCRIPTION

Figure 1:
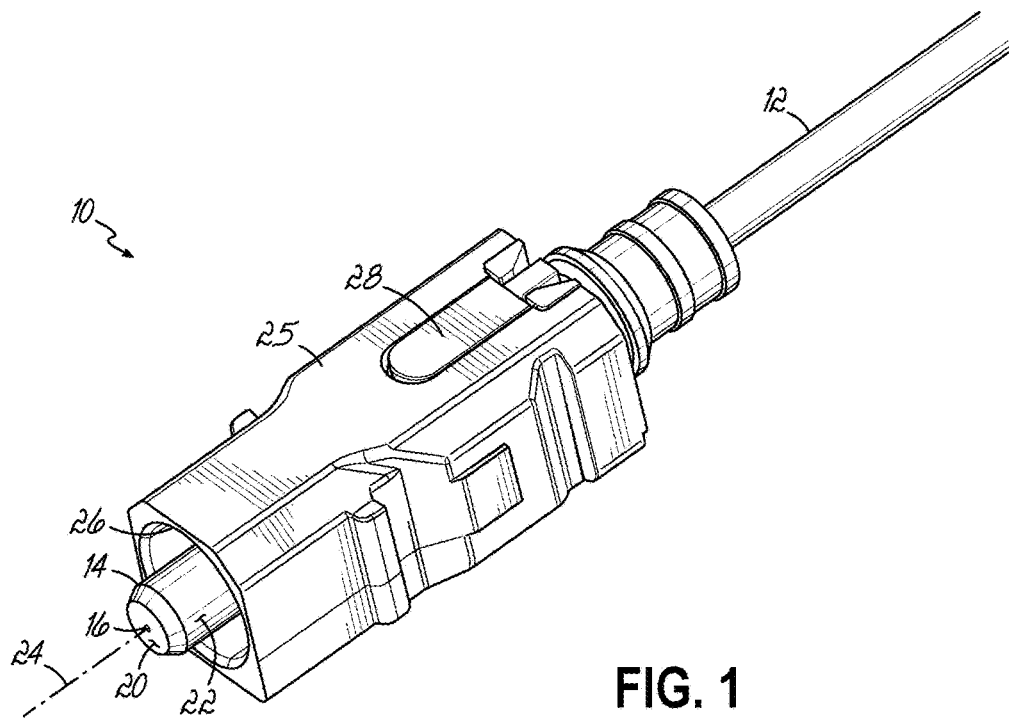
FIG. 1 is a perspective view of an exemplary fiber optic connector.

Various embodiments will be further clarified by examples in the description below. In general, the description relates to methods, systems, and software products for measuring signal loss in fiber optic connectors and cables (e.g., the fiber optic connector 10 and fiber optic cable 12, which will be referred to in this description for convenience). As used herein, signal loss caused by the fiber optic cable 12 may be referred to as "transmission loss", and signal loss caused by the optical connection may be referred to as "insertion loss", The disclosed methods, systems, and software products overcome issues associated with the need for precise placement and orientation of fiber optic cores 30 by providing light having high spatial and angular uniformity (i.e., diffuse light) into a tail-end of the optical fiber 18. This illumination approach expands the capabilities of fiber optic measurement platforms that use non-contact core-to-ferrule measurement of connectors 10. Measurements may be taken with ferrules 14 in extended and retracted positions, and additional signal loss mechanisms other than fiber core-to-ferrule concentricity errors may be identified.

As described in detail below, a reference device may include a ferrule 14 that terminates an optical fiber 18, The core 30 of the optical fiber 18 may have a known positional relationship relative to a longitudinal center axis of the ferrule 14. The reference device may also have a known signal loss. The reference device may serve as a signal loss reference for a test device including a connector 10 that terminates a different optical fiber 18. The ferrule assembly and optical fiber 18 comprising the test device may be referred to as a "device under test" or "DUT". The edges of the test ferrule 14 may be aligned in a plurality of images such that both the test ferrule 14 and reference ferrule 14 are superimposed into the same position (x, y, z) and orientation (α, β, γ) (referred to collectively as "position") in a common three-dimensional reference frame (x, y, z, α, β, γ).

The measurement system may be calibrated by characterizing the optical output of the core 30 for the reference device. The measurement system may also characterize the optical output of the core 30 for the device under test, either before or after calibration using the reference device. The optical output of the cores 30 may then be compared to determine the signal loss of the device under test relative to the signal loss of the reference device.

To ensure accurate results, the tail-ends of the reference and test devices may be illuminated using a diffuse light source including a diffuse illuminator. The diffuse illuminator may produce a diffuse light comprising a sea of incoherent photons that uniformly fill all positions and angles from which light can enter the tail-end of the optical fiber 18. This level of diffusion may allow the tail-end of the optical fiber 18 to be held by a connector body 28 having relatively loose tolerances, e.g., ±1 mm, ±3 deg between the ferrule 14 and connector body 28. Typically, the wide range of positions and angles between the ferrule 14 and connector body 28 would preclude precise measurements of signal loss due to difficulties in providing consistent illumination into the tail-end of the optical fiber 18. Using the diffuse illuminator to illuminate the tail-ends of the test and reference fiber optic cables 12 solves this problem. The diffuse illuminator may include an integrating cavity, such as an integrating sphere. The integrating cavity may be configured to provide an even and consistent illumination to the tail-ends of the reference and test devices. This illumination may be relatively insensitive to the orientation and position of the tail-ends, thereby enabling quick and accurate measurements of signal loss.

Reference can be made to the background section above and the description of FIGS. 1-3A for an exemplary connector 10, fiber optic cable 12, and ferrule 14 to which this description may apply. Indeed, various references to the connector 10, fiber optic cable 12, and ferrule 14 are made in the description that follows. It will be appreciated, however, that the description may apply to other ferrule, fiber optic cable, and/or connector types.

Figure 4:
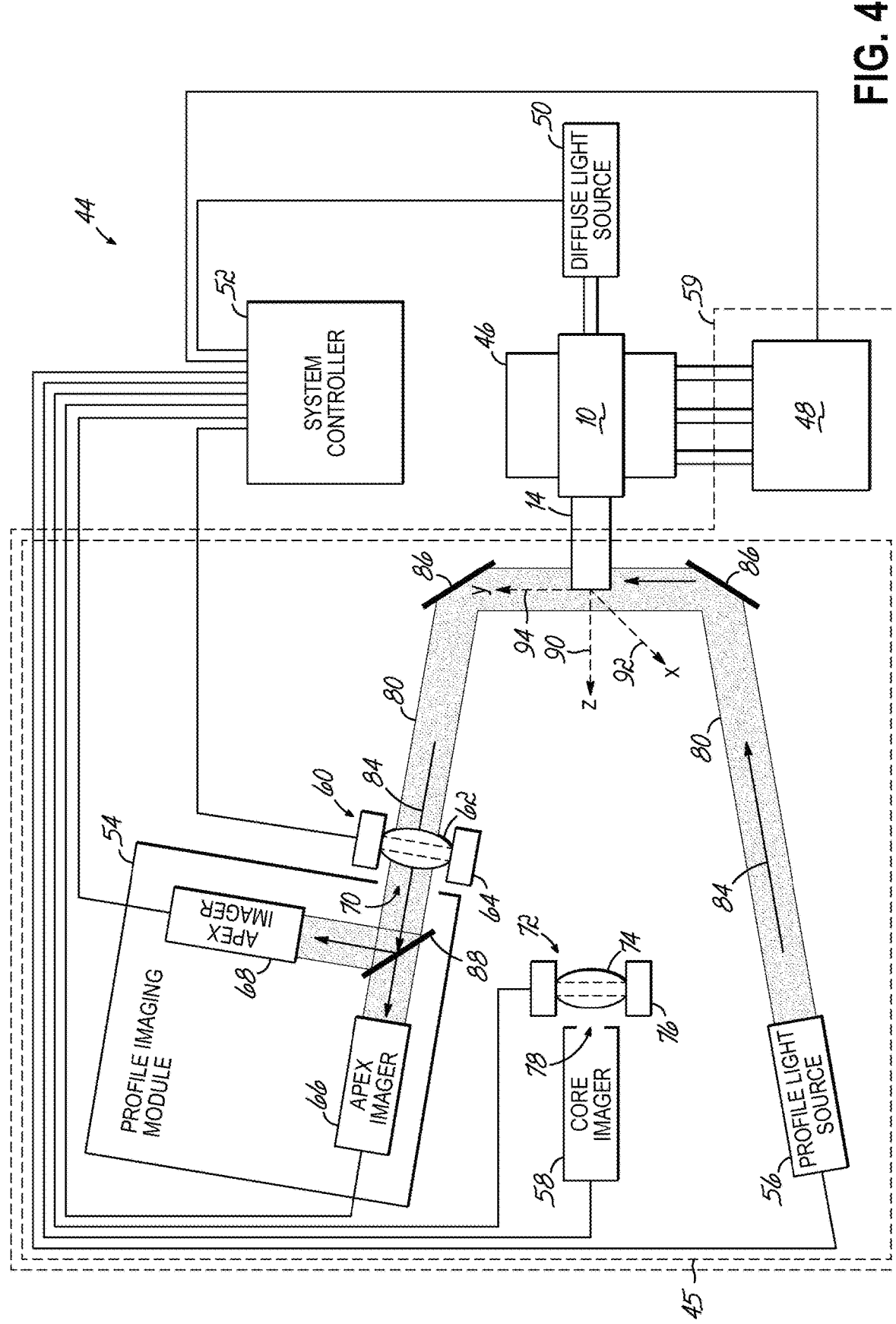
FIG. 4 is a schematic view of an exemplary measurement system including a core light source that may be used to determine a signal loss of a fiber optic cable terminated with the connector shown in FIGS. 1 and 2.
Figure 5:
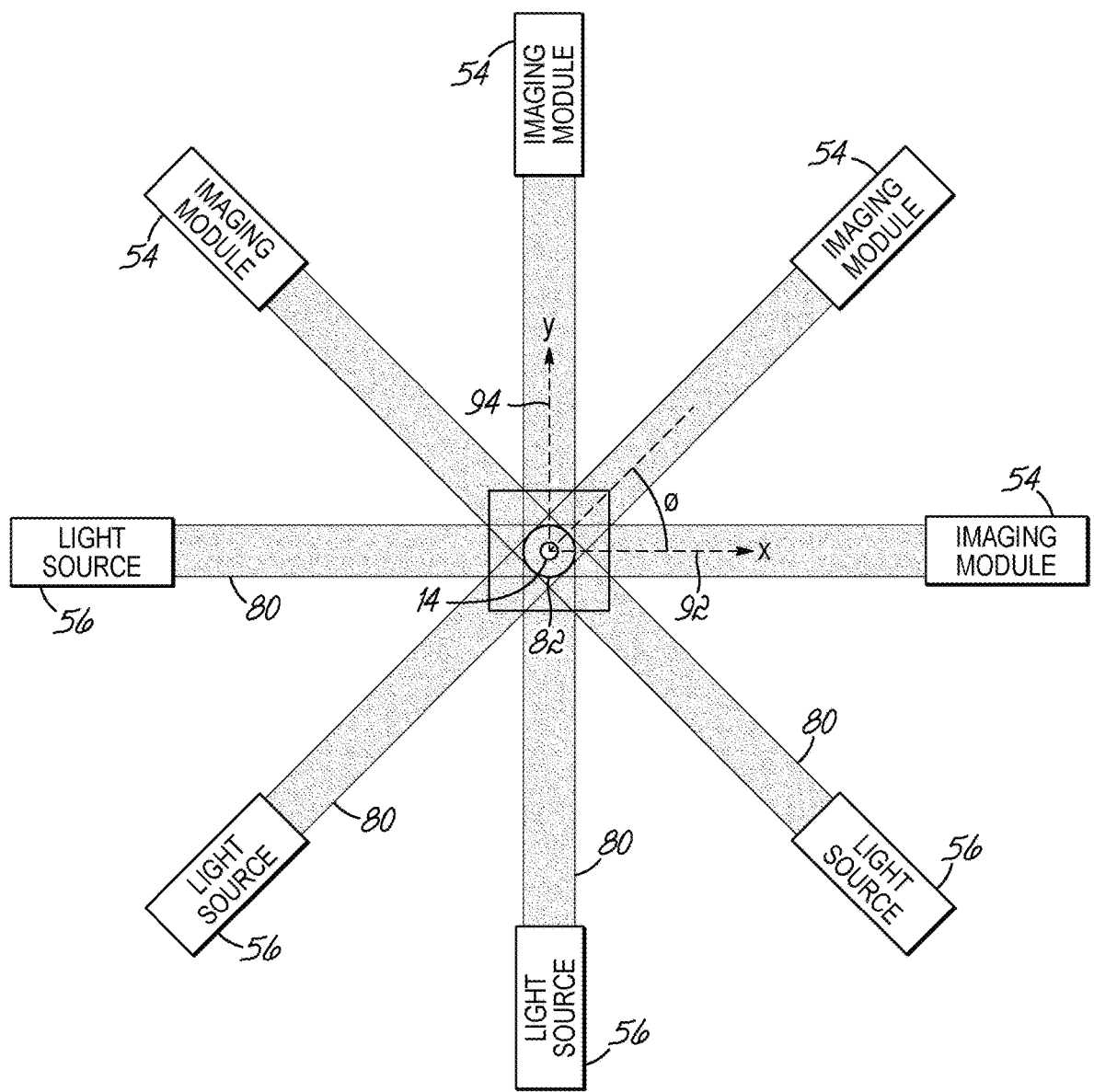
FIG. 5 is a schematic view showing an arrangement of profile imaging modules and light sources of the measurement system of FIG. 4.

With this in mind, FIGS. 4 and 5 depict an exemplary measurement system 44 that includes an imaging unit 45, a measurement port 46, a positioner 48, a diffuse light source 50, and a system controller 52. The imaging unit 45 may include a plurality of profile imaging modules 54, a plurality of profile light sources 56, and a core imager 58. The imaging unit 45 and positioner 48 may be mounted to a support assembly 59 that maintains these components in a generally fixed position relative to each other.

Each profile imaging module 54 may include a profile imaging objective assembly 60. The profile imaging objective assembly 60 may include a profile imaging objective 62 and a profile imaging objective focusing mechanism 64. The profile imaging objective focusing mechanism 64 may be configured to focus a profile image on the optical sensor of one or more apex imagers 66, 68. Each profile imaging module 54 may also include one or more aperture stops 70. Each aperture stop 70 may be located between at least one of the apex imagers 66, 68 and the profile imaging objective 62.

The core imager 58 may include a core imaging objective assembly 72. The core imaging objective assembly 72 may include a core imaging objective 74 and a core imaging objective focusing mechanism 76. The core imaging objective focusing mechanism 76 may be configured to focus a core image on the optical sensor of the core imager 58.

The measurement port 46 may be configured to receive a connector 10 (such as that shown in FIG. 1) including a ferrule 14, and may be coupled to the support assembly 59 by the positioner 48. In alternative embodiments, the measurement port 46 may be configured to receive a subassembly of a fiber optic connector, such as a ferrule assembly that consists solely of or includes the ferrule 14 with the optical fiber secured thereto (and potentially a ferrule holder or "hub" received over a rear portion of the ferrule 14).

The system controller 52 may be operatively coupled to one or more of the positioner 48, diffuse light source 50, profile imaging modules 54, profile light sources 56, core imager 58, profile imaging objective focusing mechanism 64, core imaging objective focusing mechanism 76, or individual components thereof, in order to control operation of the measurement system 44.

As best shown by FIG. 5, each profile imaging module 54 may be optically aligned with a corresponding profile light source 56 along an optical path 80. Each optical path 80 may pass by the measurement port 46 (FIG. 4) so that the ferrule 14 is optically positioned between each profile imaging module 54 and its respective profile light source 56. Thus, the ferrule 14 may be illuminated from behind (or "backlit") by each profile light source 56 from the perspective of the profile imaging module 54.

Although the exemplary embodiment depicted includes four profile imaging modules 54, it should be understood that other numbers of profile imaging modules 54 may be used. Larger numbers of profile imaging modules 54 may enable increased spatial averaging, which may reduce sensitivity of the measurement to local surface non-uniformities of the ferrule 14. Although there are no specific limits on the number of profile imaging modules 54 and light sources 56, typical implementations may include from two to sixteen pairs of profile imaging modules 54 and light sources 56, with systems having eight pairs of profile imaging modules 54 and light sources 56 providing a good tradeoff between measurement accuracy and system size and cost.

The profile imaging modules 54 may be arranged circumferentially around the measurement port 46 so that each optical path 80 intersects the ferrule 14 of connector 10 from a different angle. The intersecting optical paths 80 may define a measurement region 82 into which the ferrule 14 is positioned. The angular channel spacing may be even, with each optical path 80 having a channel angle $\gamma_{ch}=i\times\varphi$, where i is an integer from 0 to (m−1), m is the total number of optical paths 80, and $m\times\varphi=2\pi$ radians.

Each profile light source 56 may include one or more illuminants (e.g., incandescent or florescent bulbs, light emitting diodes (LED), lasers, etc.) and optical elements (e.g., lenses, diaphragms, diffusers, etc.) configured to emit light 84 (FIG. 4) that provides even illumination (e.g., Kohler illumination) at the ferrule 14. The circumferential arrangement of the profile imaging modules 54 may enable measurement of a cylindrical form factor object, e.g., the ferrule 14. The illumination rays may be directed across the ferrule 14 so that the rays are intercepted tangentially by the outer surface 22 (FIG. 1) of the ferrule 14.

As best shown by FIG. 4, the optical path 80 may be folded using one or more reflectors 86, e.g., mirrors, prisms, or the like. The reflectors 86 may allow flexible placement of the profile imaging modules 54 and light sources 56 while maintaining a generally orthogonal angle of incidence between the rays of light 84 and the center axis of ferrule 14.

Each profile imaging module 54 may include at least one imaging device (e.g., two apex imagers 66, 68), and a beam splitter 88. The beam splitter 88 may be used to split beams of light received by the profile imaging module 54 into separate beams, one for each apex imager 66, 68. The beam splitter 88 may thereby facilitate packaging of the apex imagers 66, 68 in the profile imaging module 54, e.g., by allowing the apex imagers 66, 68 to be oriented at right angles and offset spatially from each other.

The profile imaging modules 54 may be arranged in a frustoconical shape with cylindrical symmetry about the z-axis. The inside diameter of the narrow end of the frustoconical arrangement may define the space available for profile light source and profile imaging module optical components, e.g., objective assemblies 60. The number of profile imaging channels multiplied by the separation angle between the profile imaging channels may be limited to a maximum of 360 degrees. The measurement system 44 may use a single profile imaging channel (i.e., profile light source 56/profile imaging module 54 pair) to collect multiple views (e.g., two views) of the ferrule. This may enable a multiple number of (e.g., twice as many) views as compared to having a single view per channel.

Each profile light source 56 may provide light 84 having a cross-section larger than the ferrule 14, thereby backlighting both apexes and the end-face of the ferrule 14. Each profile imaging objective 62 may generate an image of the visible ferrule profile. However, only the areas of the ferrule profile containing position information may be recorded by the apex imagers 66, 68. One apex imager 66, 68 may capture one apex while the other apex imager 66, 68 captures the opposing apex. In this way, the imaging system may capture two full-resolution images of the ferrule profile using a single profile imaging objective 62.

Each of the core imager 58 and apex imagers 66, 68 may include an image sensor, e.g., a charge-coupled device or active-pixel sensor comprising a two-dimensional array of sensor elements. Each objective assembly 60, 72 may be configured to focus an image of a portion of the ferrule 14 on the image sensor of a respective imager 58, 66, 68. The core imager 58 may be configured so light emerging from the core 30 of the optical fiber 18 in the ferrule 14 (i.e., the core of the device under test) can be focused as an image on the image sensor. The apex imagers 66, 68 of each profile imaging module 54 may be configured so that portions of the ferrule silhouette corresponding to opposing apexes of the outer surface 22 of ferrule 14 and portions of the end-face 20 are focused as images on their respective image sensors.

Each apex imager 66, 68 may be configured to capture an image centered on a different portion of the ferrule 14. Each profile light source 56 may backlight the ferrule 14 with respect to its respective profile imaging module 54. This backlighting may cause the profile imaging module 54 to produce images of the ferrule 14 having characteristics similar to that of a silhouette. Replicating the optical paths 80 multiple times around the center axis 24 of ferrule 14 may provide multiple profile images from which to extract the position of the ferrule 14. Backlighting the ferrule 14 may result in high contrast between areas of the image occupied by the ferrule 14, and areas of the image not occupied by the ferrule 14. Advantageously, high contrast images may allow for short exposure times, lower image noise, and facilitate determining the location of edges in the image associated with the end-face 20 or an apex of the outer surface 22 of ferrule 14. However, it should be understood that in alternative embodiments, other forms of lighting, such as side lighting or front lighting (e.g., from a profile light source 56 associated with another profile imaging module 54) could be used to illuminate the ferrule 14.

The positioner 48 may include one or more actuators (e.g., piezoelectric elements, precision screw drives, or the like) configured to provide a six-degree of freedom movement to the measurement port 46. By way of example, the positioner 48 may include a hexapod (sometimes referred to as a Stewart platform) having a 6-axis (x, y, z, α, β, γ) actuator system. Although the orientation and position of each of these axes may be arbitrarily assigned, to provide a common frame of reference, the z-axis may be considered as being aligned with a vector 90 pointing from the end-face 20 of ferrule 14 toward the core imager 58. Thus, the position and orientation of the z-axis may be coextensive with the longitudinal center axis 24 (FIG. 1) of ferrule 14 when the ferrule 14 is aligned with the measurement system 44. Following the right-hand rule, the x-axis may be considered as being aligned with a horizontal vector 92 orthogonal to the z-axis (i.e., pointing outward from FIG. 2), and the y-axis may be considered as being aligned with a vertical vector 94 orthogonal to (e.g., pointing upward from) both the z and x-axes. As described herein, tip (α), tilt β), and rotation (λ) may correspond to rotation about each of the respective x, y, and z-axes. By moving the ferrule 14 in each of these six axes (x, y, z, α, β, γ), the positioner 48 may enable the system controller 52 to position the ferrule 14 precisely relative to the components mounted to the support assembly 59, e.g., the profile imaginal modules 54, the profile light sources 56, and the core imager 58.

Figure 6:
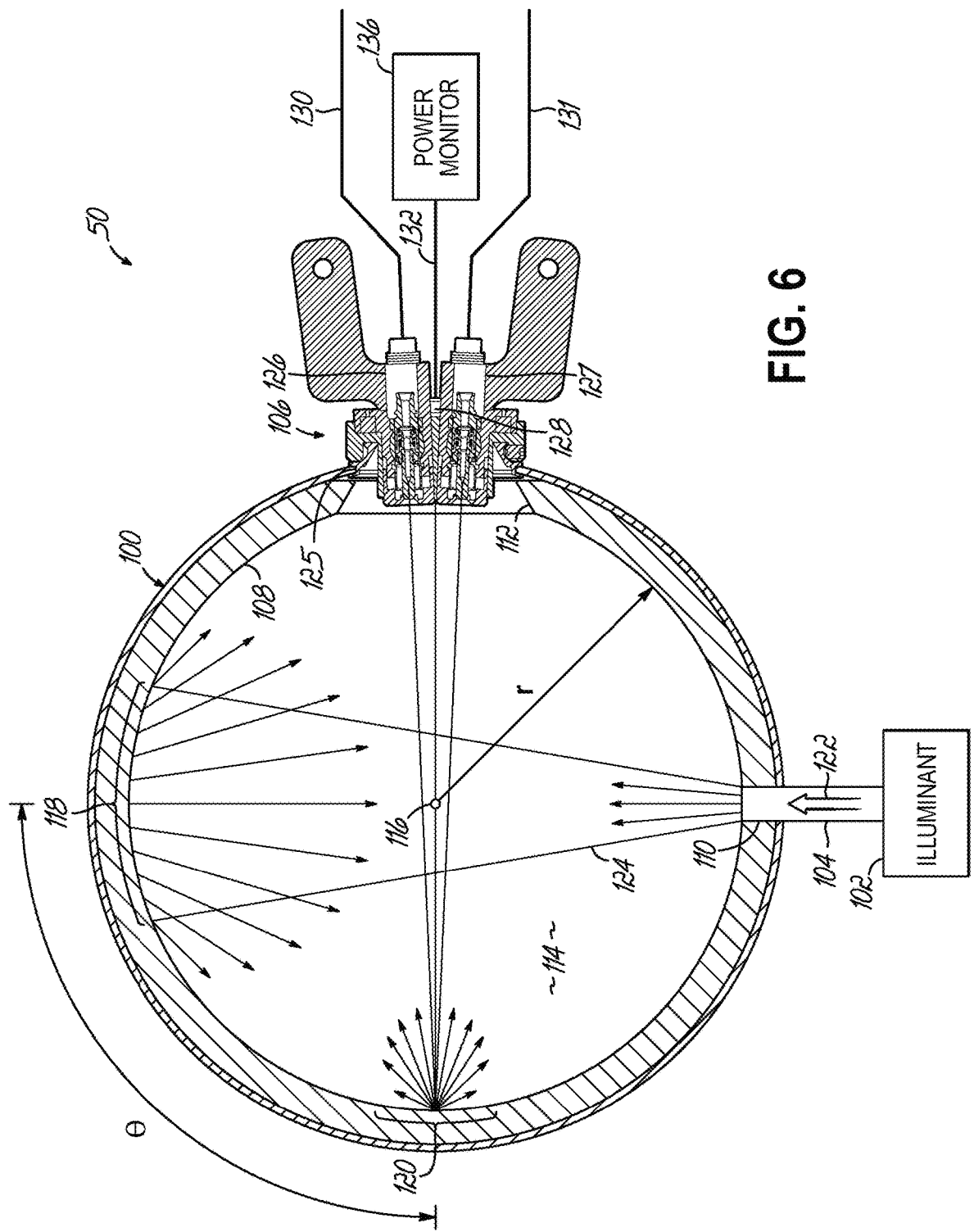
FIG. 6. is a diagrammatic view depicting an exemplary embodiment of the core light source of FIG. 4 that includes an output port assembly.

FIG. 6 depicts an exemplary diffuse light source 50 including an integrating chamber 100, an illuminant 102, a light pipe 104 that operatively couples the integrating chamber 100 to the illuminant 102, and an output port assembly 106 configured to receive the tail-ends of the reference device and the device under test. The integrating chamber 100 may include an interior surface 108, an input aperture 110, and an output aperture 112. The interior surface 108 may be highly and diffusely reflective, and define a spherical cavity 114 having a radius r and a center of radius 116. The input and output apertures 110, 112 may be located so that they face different target areas 118, 120 of the interior surface 108. To this end, the center of the input aperture 110 may be offset from the center of output aperture 112 by an offset angle θ. As a result, the target area 118 across from the input aperture 110 may be offset the target area 120 across from the output aperture 112 by the same offset angle θ. The offset angle θ may be selected so that the target areas 118, 120 are orthogonal to each other, e.g., by selecting a 90 degree angle.

The illuminant 102 may include a bar laser or other device that produces a high-power multi-mode beam of light 122. The light pipe 104 may include an integrating rod (e.g., a hexagonal integrating rod) or other suitable optical device having an input end that receives the beam of light 122 from the illuminant 102, and an output end that emits light 124 into the integrating chamber 100 through the input aperture 110. The light pipe 104 may spread the beam of light 122 spatially and angularly as the light propagates through the light pipe 104 so that the light 124 emitted into the integrating chamber is uniformly and evenly distributed. Each target area 118, 120 may be a generally circular area having dimensions that depend on the distance from, and numerical aperture of, the optical fiber 18 or light pipe 104 that is aimed at the target area 118, 120.

The output port assembly 106 may be operatively coupled to the output aperture 112 by a coupling ring 125, and include a plurality of ports 126-128 each configured to receive the tail-end of a respective fiber optic cable 130-132. The fiber optic cables 130-132 may include a test fiber optic cable 130 of the device under test, a reference fiber optic cable 131 of the reference device, and a power monitor fiber optic cable 132 having a head-end operatively coupled to a power monitor 136. Each of the head and tail-ends of the test and reference fiber optic cables 130, 131 may be terminated by a connector 10 (not shown).

The power monitor 136 may include a camera or other imaging device configured as a gated power meter. The gating of the measurements from the power monitor 136 may be controlled by the same signal used to control the core imager 58 so that the power measurement is synchronized with the capture of one or more core images, A radiant flux measurement of the cores 30 of the reference and test devices may thereby be made for the same measurement period as the power measurement. The power measured by the power monitor 136 may be used to normalize out any time-based variation in the output of the illuminant 102.

The diffuse nature of the light provided to the tail-ends of the fiber optic cables 130-132 may result in the optical fiber 18 of each fiber optic cable 130-132 being fully illuminated regardless of the precise mode field diameter or numerical aperture at the connector 10. Accordingly, the use of the integrating chamber 100 to couple light from the illuminant 102 into the tail-ends of the reference and test devices may enable a pseudo-etendue measurement by providing the same light grasp to lower mode field diameter/higher numerical aperture and higher mode field diameter/lower numerical aperture optical fibers. This insensitivity to variations in the characteristics of the tail-end of each optical fiber 18 may ensure that the measurements at the head-end of the optical fiber 18 are not influenced by fiber parameter anomalies. The uniform radiance and diffuse nature of the light may allow signal loss measurements to be independent of the precise mode field diameter, position, and orientation of the tail-ends of the optical fibers 18, and may also allow the tail-ends of the fiber optic cables 130-132 to be illuminated simultaneously for operating convenience.

Integrating spheres are typically inefficient in terms of the fraction of light 124 emitted into the sphere that is coupled into the fiber optic cables 130-132. The light 124 enters the integrating chamber 100 and spreads out so that it illuminates the interior surface 108 with a uniform radiance. The optical fiber 18 of each fiber optic cable 130-132 only intercepts the portion of the light that falls within a region defined by the core area and numerical aperture of the optical fiber 18. By way of example, for a spherical integration chamber having a 75 mm diameter and a single mode optical fiber 18 having a numerical aperture of 0.12 and core diameter of 10 μm diameter, the fraction of light 124 coupled into the optical fiber 18 would be about $1 \times 10^{-9}$ of the amount of light 124 emitted into the integration chamber 100.

Increasing the size of the integrating chamber 100 may increase the area from which light is gathered by the optical fibers 18. Increasing the size of the integrating chamber 100 may also decrease the relative size of the input and output apertures 110, 112 in terms of their percentage of the total area of the interior surface 108, and decrease the angular distance between the tail-ends of the fiber optic cables 130-132. Additional light 122 may be introduced into the optical chamber 100 to compensate for a reduced radiance as the size of the optical chamber 100 is increased. This additional light 122 may be provided by a higher power illuminant 102, or by introducing additional Illuminants and input apertures. Thus, the power and uniformity delivered to the tail-ends of the reference and test devices can be adjusted as needed by scaling the integrating chamber 100.

Because the amount of light coupled into the optical fiber 18 sets a floor on the precision of a signal loss measurement, measuring signal loss to a specified precision may require a minimum flux level. The ultimate noise floor of a measurement may be defined by shot noise due to the finite number of photons available to make the measurement. For example, a measurement accurate to one one-thousandth of a decibel (i.e., approximately 1 part in 4,000) requires roughly $1.9 \times 10^7$ photons. To emit that many photons over a 1 msec measurement interval at a wavelength of 1.6 μm would require injecting about $2 \times 10^{-9}$ watts of light into the tail-end of the optical fiber 18. Combining these two requirements means that an integrating chamber 100 having a coupling efficiency of about $1 \times 10^{-9}$ would need to be illuminated with a source that provides two watts of light 122. This amount of light can be provided by a laser, for example.

A coherent laser light shining on a diffuse surface may give rise to speckle. Speckle results when the optical field at a viewing point includes contributions from multiple directions, with each contribution having a random phase. The combination of random phases can result in a deeply modulated pattern that is random and stationary. Because speckle can result in disproportionally large changes in radiant flux in response to small changes in position and angle, it is desirable to avoid generating speckle within the integrating chamber 100.

One way to mitigate speckle may be through the use of a plurality or continuum of wavelengths. Using light 124 having many wavelengths may result in the production of many speckle patterns, one at each wavelength. These speckle patterns may overlay each other to produce a consistent average flux density. A plurality of wavelengths may be provided, for example, by dithering the phase of a laser mode, by a plurality of laser modes, or by a combination of multiple modes and dithered phases.

In an alternative embodiment, another way to mitigate speckle may be to introduce relative mechanical motion during the measurement integration time. For example, a laser or light guide may be moved during measurements such that the source of the light 124 spatially varies and thereby generates many speckle patterns to overlay each other. A similar effect may be achieved by a moving diffuser, similar to techniques in the field of interferometry.

In an alternative embodiment of the diffuse light source 50, speckle may be mitigated by using laser-pumped fluorescence. In this embodiment, the interior surface 108 of integrating chamber 100 may be coated with a fluorescent material. The fluorescent material may be excited by light 124 from a laser, and would emit light over a continuum of wavelengths. The wavelength of the light 124 could be significantly different than the light emitted by the fluorescent material, thereby enabling the light 124 to be filtered out before the light 124 reached the tail-ends of the fiber optic cables 130-132.

Figure 7A:
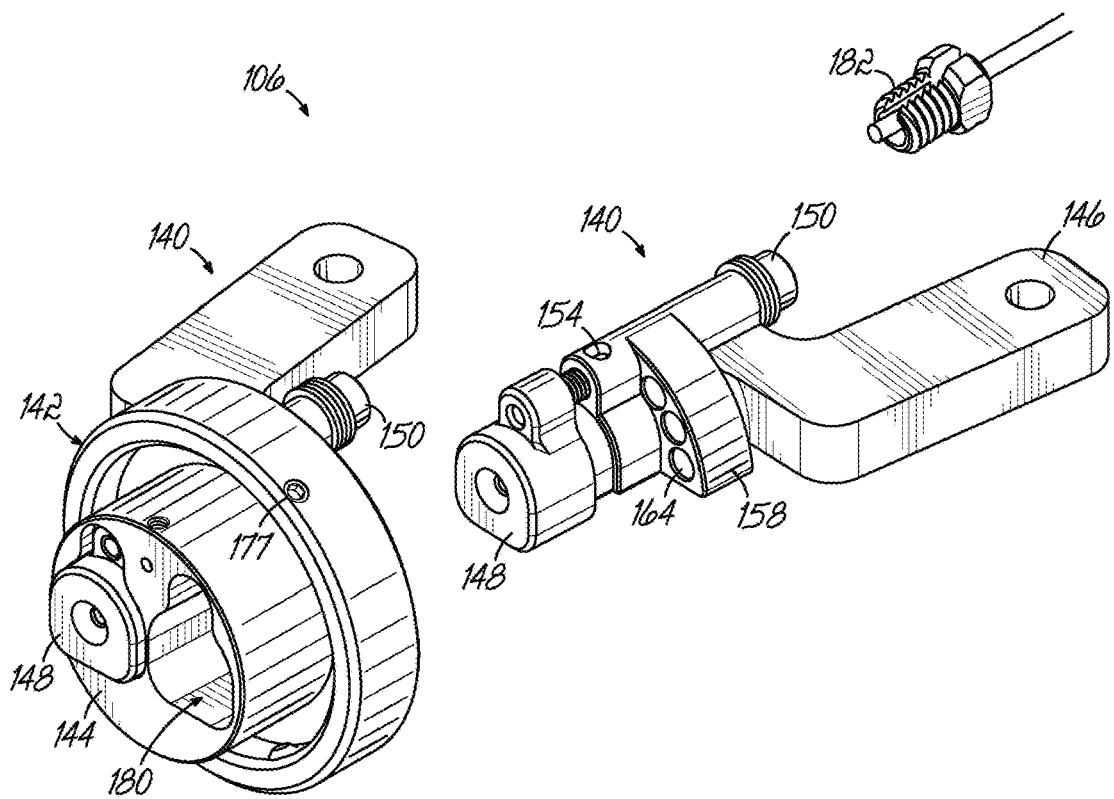
FIGS. 7A-9 are perspective views depicting an exemplary embodiment of the output port assembly of FIG. 6 that includes a receiver assembly.
Figure 7B:
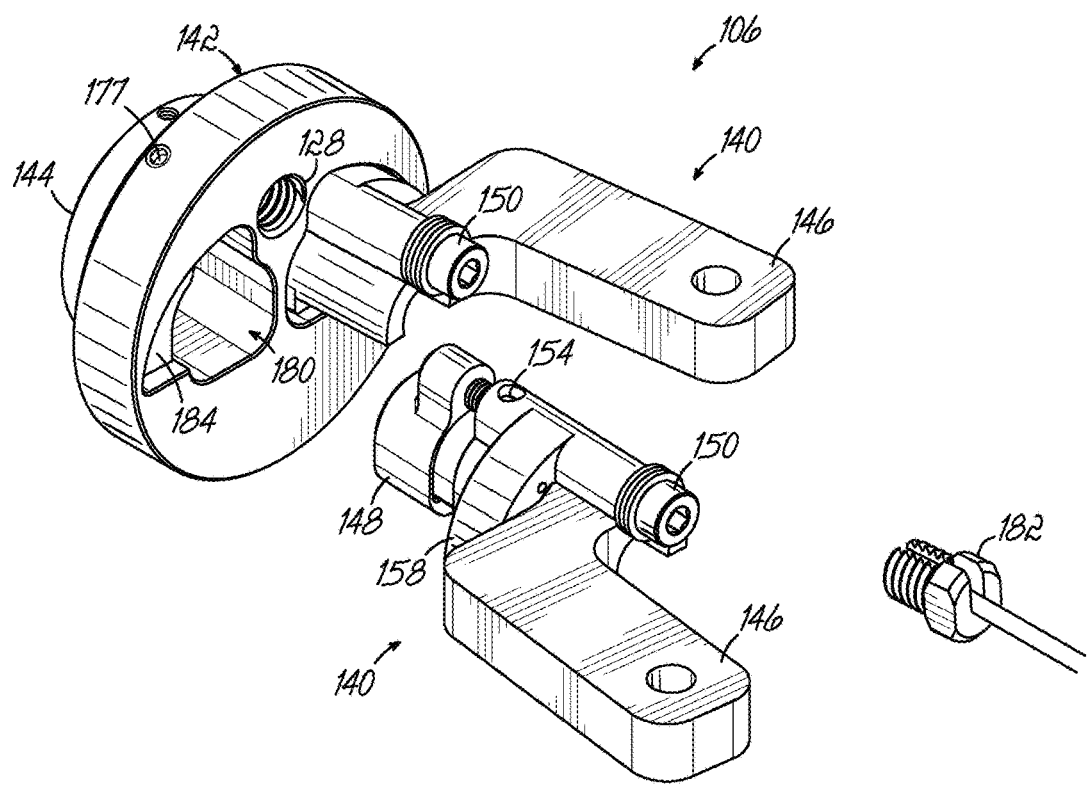
Figure 8:
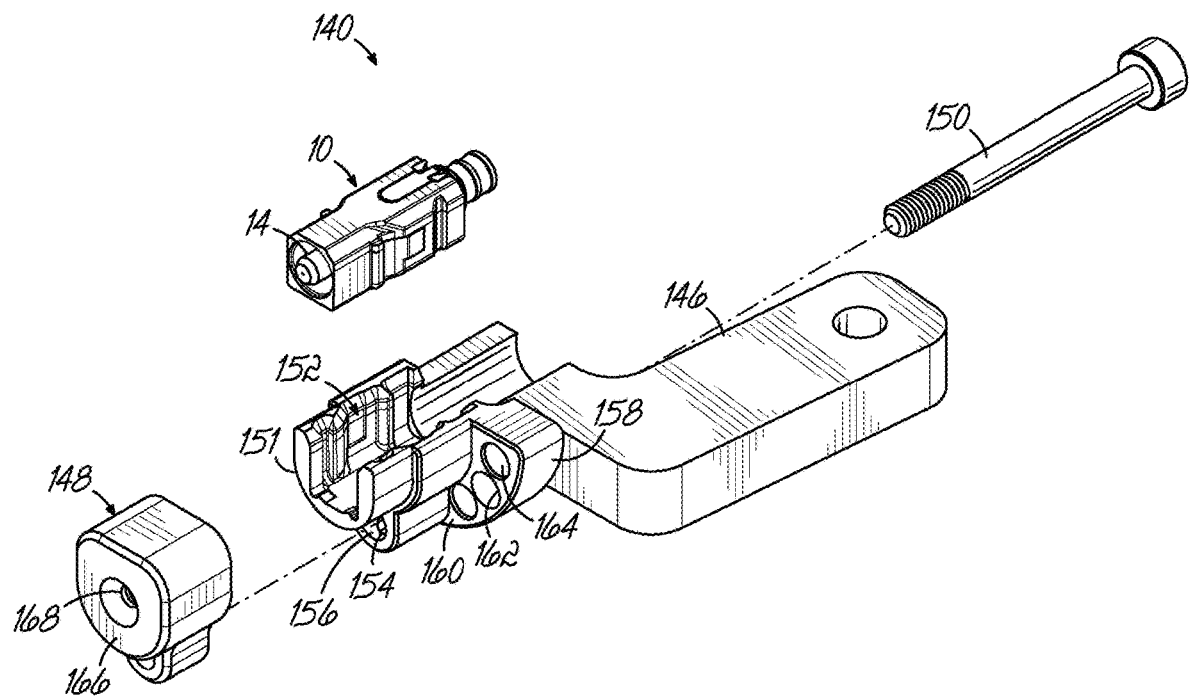
Figure 9:
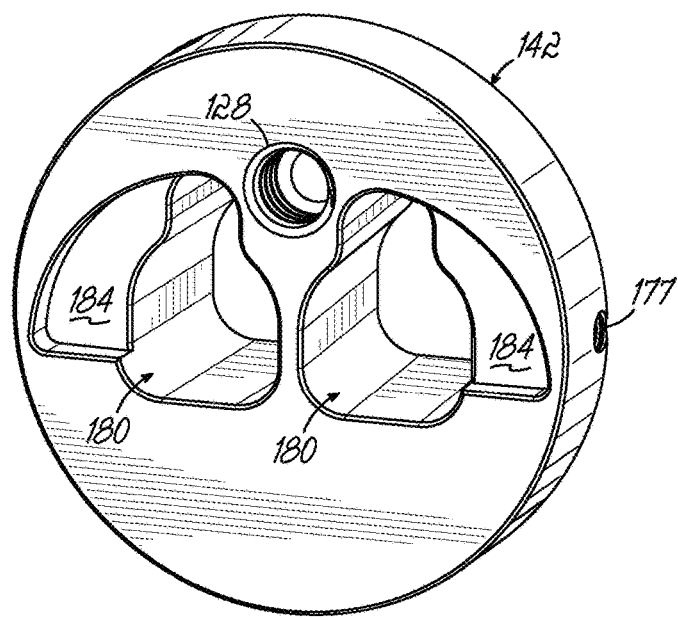

FIGS. 7A-9 depict an exemplary embodiment of the output port assembly 106. As best shown in FIGS. 7A and 7B, the exemplary output port assembly may include a plurality of receiver assemblies 140, (e.g., two receiver assemblies 140), and a port adapter 142 having a front surface 144. Each receiver assembly 140 may be configured to receive a connector 10, and include a receiver body 146, a compression cap 148, and a retaining bolt 150 configured to operatively couple the compression cap 148 to the receiver body 146.

The receiver body 146 may include a nose 151 configured to receive the compression cap 148, a slot 152 configured to receive the connector 10, and may be made from any suitable material, e.g., plastic. Although the exemplary slot 152 of receiver body 146 is depicted as being configured to receive an SC-type connector, it should be understood that other embodiments of the receiver body 146 may include a slot 152 configured to receive other types of connectors. An access hole 154 in the bottom of the slot 152 may facilitate removal of the connector 10, e.g., by allowing insertion of a rod or other instrument to push the connector 10 out of the slot 152, The receiver body 146 may further include a bore 156 configured to pass the retaining bolt 150 through to the compression cap 148, and a flange 158 having a forward-facing surface 160. The forward-facing surface 160 of flange 158 may include one or more apertures 162 each configured to receive a magnet 164.

Figure 10:
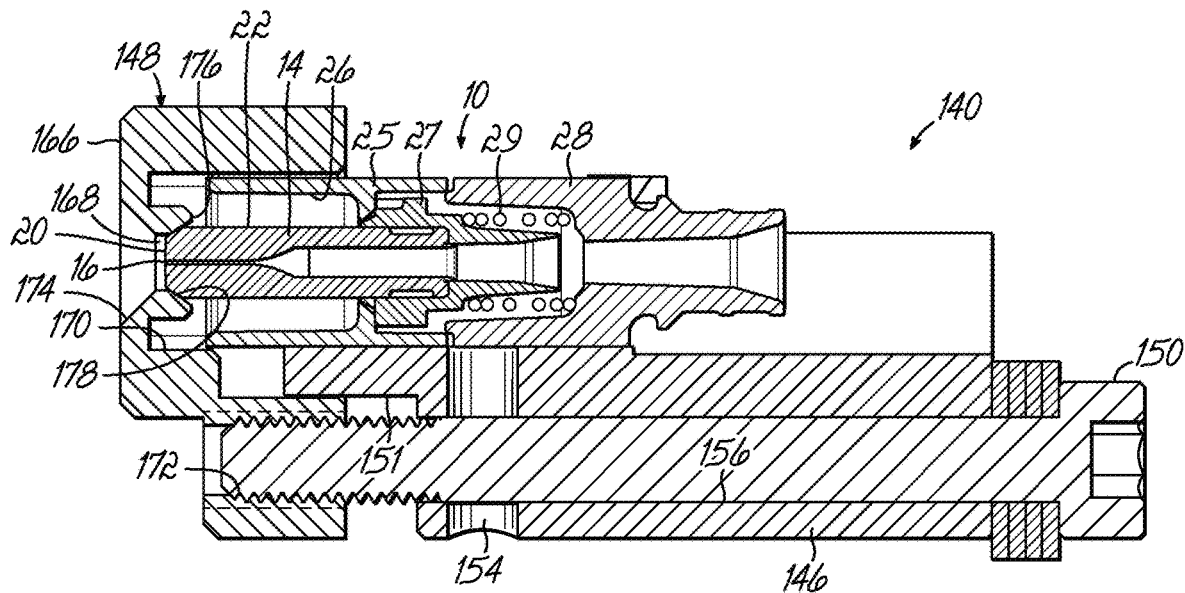
FIGS. 10 and 11 are cross-sectional views of an exemplary embodiment of the receiver assembly of FIGS. 7A-9 showing a ferrule in extended and retracted positions.
Figure 11:
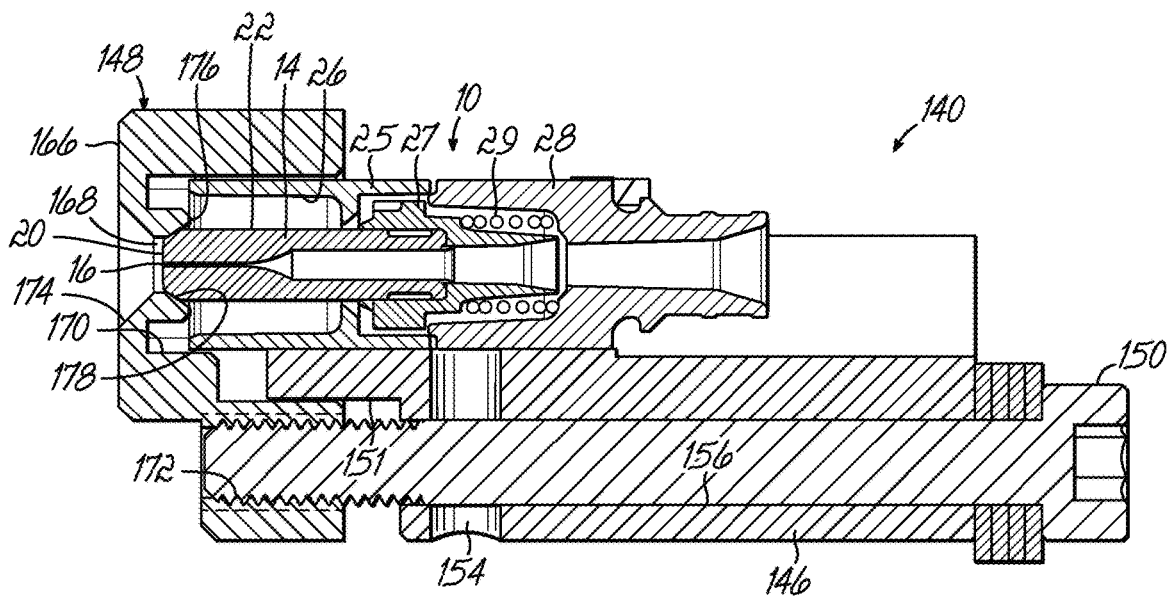

As illustrated in FIGS. 10 and 11, each compression cap 148 may include a front surface 166 having an aperture 168, a receptacle 170, and a threaded bore 172 configured to receive a distal end of the retaining bolt 150. The nose 151 of receiver body 146 and the receptacle 170 of compression cap 148 may be keyed (e.g., have a D-shape cross-section) to prevent rotation and to insure correct orientation between the receiver body 146 and compression cap 148. The aperture 168 may have a front opening 174 and a rear opening 176. Each of the front and rear openings 174, 176 may have a wide outwardly facing end, a narrow inwardly facing end, and a frustoconical surface that joins the outwardly and inwardly facing ends. The frustoconical surfaces of the front and rear openings 174, 176 may intersect within the aperture 168 to define an orifice through which light can pass between the spherical cavity 114 and the tail end of the reference device or device under test. The frustoconical surface of the rear opening 176 may provide a seat 178 that engages the ferrule 14 when the compression cap 148 is installed on the receiver assembly 140. By way of example, the seat 178 may be configured to engage a chamfer connecting the end-face 20 to the outer surface 22 of ferrule 14 so that at least a portion of the end-face 20 is exposed to the spherical cavity 114 of integrating chamber 100.

The receiver assembly 140 and compression caps 148 may be configured so that when the receiver assembly 140 is operatively coupled to the port adapter 142, the front surface 166 of compression cap 148 is generally flush with the front surface 144 of port adapter 142. As described in more detail below, the exact position of the front surface 166 of compression cap 148 relative to the front surface 144 of port adapter 142 may depend in part on how tightly the retaining bolt 150 is torqued into the threaded bore 172.

The port adapter 142 may be formed from any suitable material, such as 420 stainless steel or another material that is attracted to magnets. The port adapter 142 may be operatively coupled to a rim of the coupling ring 125 by one or more set screws 177, and include the power monitor port 128 and a plurality of receptacles 180, e.g., two receptacles. Each receptacle 180 may be configured to receive a receiver assembly 140. The power monitor port 128 may include a threaded surface configured to receive a power monitor retainer 182 that operatively couples the tail-end of power monitor fiber optic cable 132 to the spherical cavity 114. Each of the power monitor port 128 and the receptacles 180 may be configured so that the tail-end of each fiber optic cable 130-132 is aimed at the center of the same target area 120 of the interior surface 108 of integrating chamber 100, and so that the end-face 20 of the ferrule 14 of each fiber optic cable 130-132 is generally aligned with the interior surface 108 of integrating chamber 100.

A connector 10 may be installed into the receiver assembly 140 by sliding the connector housing 25 into the slot 152 of receiver body 146. When the connector 10 is in the slot 152, the compression cap 148 may be placed over the end of the receiver body 146. The compression cap 148 may be coupled to the receiver body 146 by inserting the retaining bolt 150 (e.g., an M3 shoulder bolt) through the bore 156 and tightening the retaining bolt 150 until the compression cap 148 bottoms out. The compression cap 148 may be considered to be bottomed out when there is no play between the compression cap 148 and the receiver body 146. The system operator may then clean the protruding end-face 20 of ferrule 14 prior to inserting the receiver assembly 140 into a receptacle 180 of port adapter 142.

Each receptacle 180 may include a stop face 184 configured to engage the flange 158 of receiver body 146. The stop face 184 may thereby position the receiver assembly 140 longitudinally within the receptacle 180. The magnets 164 embedded in the flange 158 may hold the receiver assembly 140 in position within the receptacle 180 by magnetic attraction to the stop face 184. This magnetic coupling between the receiver assembly 140 and port adapter 142 may enable receiver assemblies 140 to be easily and quickly coupled to and decoupled from the output port assembly 106.

The output port assembly 106 may be configured so that the end-face 20 of the ferrule 14 for each fiber optic cable 130-132 is located at the same distance from the center of radius 116 as the inner surface 108 of integration chamber 100. The light gathered by each optical fiber 18 of the fiber optic cables 130-132 may originate from a circular area determined by the numerical aperture of the optical fiber 18. Aiming each optical fiber 18 of fiber optic cables 130-132 at the same point on the opposite side of the integrating chamber 100 may minimize the effects of any non-uniformities in the inner surface 108 so that each tail end is provided with equal amounts of light.

FIGS. 10 and 11 depict cross-sectional views of the receiver assembly 140 in an uncompressed state (FIG. 10) and in a compressed state (FIG. 11). When the connector 10 is not operatively coupled to another fiber optic cable, the ferrule 14 may be placed into an extended position relative to the connector housing 25 by the spring 29. When the connector 10 is inserted into an adapter or otherwise mated to another connector 10, the ferrule 14 may come into physical contact with the ferrule 14 of the mating connector 10. Insertion of the connector 10 into the adapter may continue for a short distance after initial physical contact between ferrules 14 is established. This may cause the ferrule 14 of the connector 10 to move into a retracted position relative to the connector housing 25.

In the uncompressed state, the compression cap 148 may be unloaded or lightly preloaded against the ferrule 14. To achieve the uncompressed state, the retaining bolt 150 may loosened within the threaded bore 172 of compression cap 148 such that the spring 29 of connector 10 urges the ferrule 14 into its extended position. In the extended position, the position of the ferrule 14 may be set by contact between the ferrule holder 27 and the connector housing 25. The uncompressed state may simulate the state of the connector 10 when the ferrule 14 is not operatively coupled to another ferrule 14.

To achieve the compressed state, the retaining bolt 150 may be tightened until the compression cap 148 bottoms out against the receiver body 146. The receiver body 146 and compression cap 148 may be configured so that when the compression cap 148 bottoms out in this manner, the ferrule holder 27 is moved rearward by a predetermined amount (e.g., 0.5 mm) and out of contact with the connector housing 25. This rearward movement of the ferrule holder 27 may compress the spring 29 such that the spring 29 urges the ferrule 14 into contact with the seat 178 of compression cap 148. That is, when the compression cap 148 is in the compressed position, forward movement of the ferrule 14 may be prevented by contact between the ferrule 14 and the compression cap 148. Thus, adjusting the receiver assembly 140 so it is in the compressed state may simulate the state of the connector 10 when the ferrule 14 is operatively coupled to another ferrule.

The passive free space coupling of light into the reference and test devices provided by the diffuse light source 50 allows connectors 10 to be tested with their ferrules 14 in extended and retracted positions. Rotating the retaining bolt 150 may adjust the position of the compression cap 148 relative to the receiver body 146. Thus, the position of the ferrule 14 can be adjusted so that the compression cap 148 contacts the chamfer of the ferrule 14 and causes the ferrule 14 to retract relative to the connector housing 25. This feature may facilitate taking measurements with the ferrule 14 in different states of retraction. Typically, the ferrule 14 of the reference device may be left in an extended state to provide a constant signal loss reference level.

Advantageously, by enabling measurements of the device under test with the ferrule 14 in retracted and extended positions, the receiver assembly 140 may enable detection of defects that only appear when the ferrule 14 of the device under test is retracted, such as when the device under test is connected to another fiber optic cable. For example, retraction induced macro bends typically only appear when the connector 10 is in a loaded state. Signal loss mechanisms that can be detected in addition to retraction induced macro bends may include, but are not limited to, core retraction, macro bends, core fracture, end-face damage, core/cladding anomalies, and ferrule induced core stresses.

Because the retaining bolts 150 remain accessible when the receiver assembly 140 is inserted into the receptacles 180, and rotation of the receiver assembly 140 is prevented by the keyed compression cap 148 and receptacle 180, the receiver assembly 140 can be changed between compressed and uncompressed states without being removed from the port adapter 142. The combination of keyed components and magnetic coupling between the receiver assembly 140 and port adapter 142 may also enable connectors 10 to be located firmly and repeatably.

Figure 12:
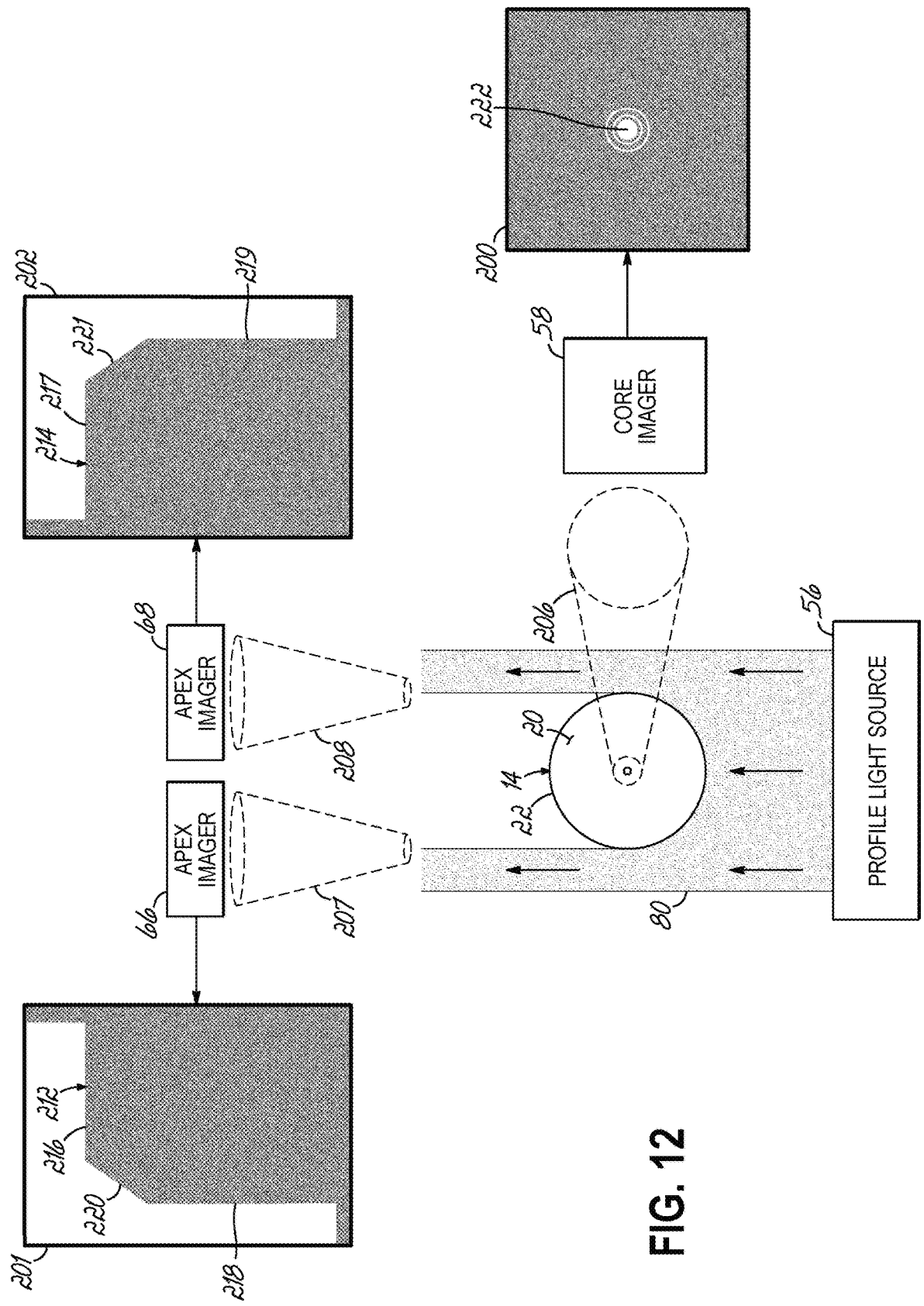
FIG. 12 is a diagrammatic view of exemplary images that may be captured by the measurement system of FIG. 1.

FIG. 12 depicts exemplary images 200-202 that may be captured by the core imager 58 and apex imagers 66, 68 during operation of the measurement system 44. The core imager 58 and apex imagers 66, 68 may have a respective magnification or "gain" 206-208 that provides an optimum image scale for determining ferrule position based on the location of image elements in the images 200-202. For example, the gain 206 of core imager 58 may be set so that the width of each pixel in the core image 200 corresponds to a distance of 0.1 to 1.6 µm at the end-face 20 of ferrule 14, with a typical gain being $g=0.4$ µm/pixel. As another example, the gain 207, 208 of each apex imager 66, 68 may be set so that the width of each pixel in the profile images 201, 202 corresponds to a distance of 0.3 to 4.8 µm at the apexes of ferrule 14, with a typical gain being $g=1.2$ µm/pixel. Having a known image gain for each image 200-202 may enable the position and orientation of the ferrule 14 to be determined based on the size and location of image elements in units of pixels.

Figure 2:
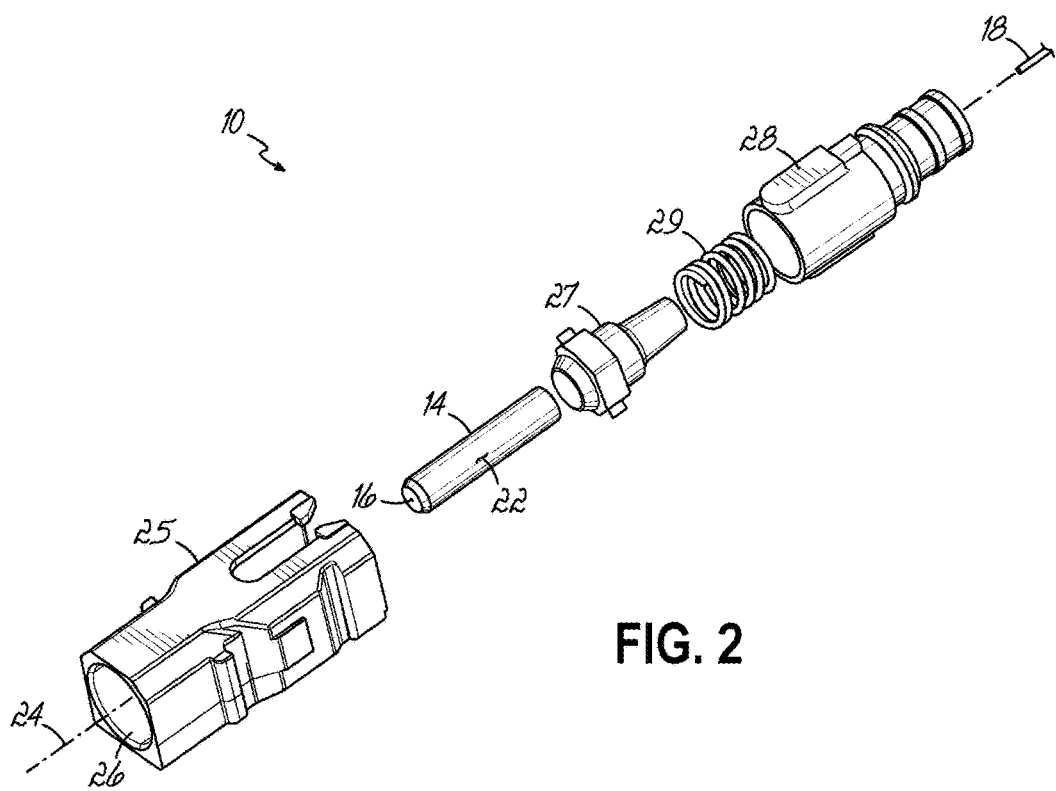
FIG. 2 is an exploded perspective view of the fiber optic connector shown in FIG. 1.
Figure 3:
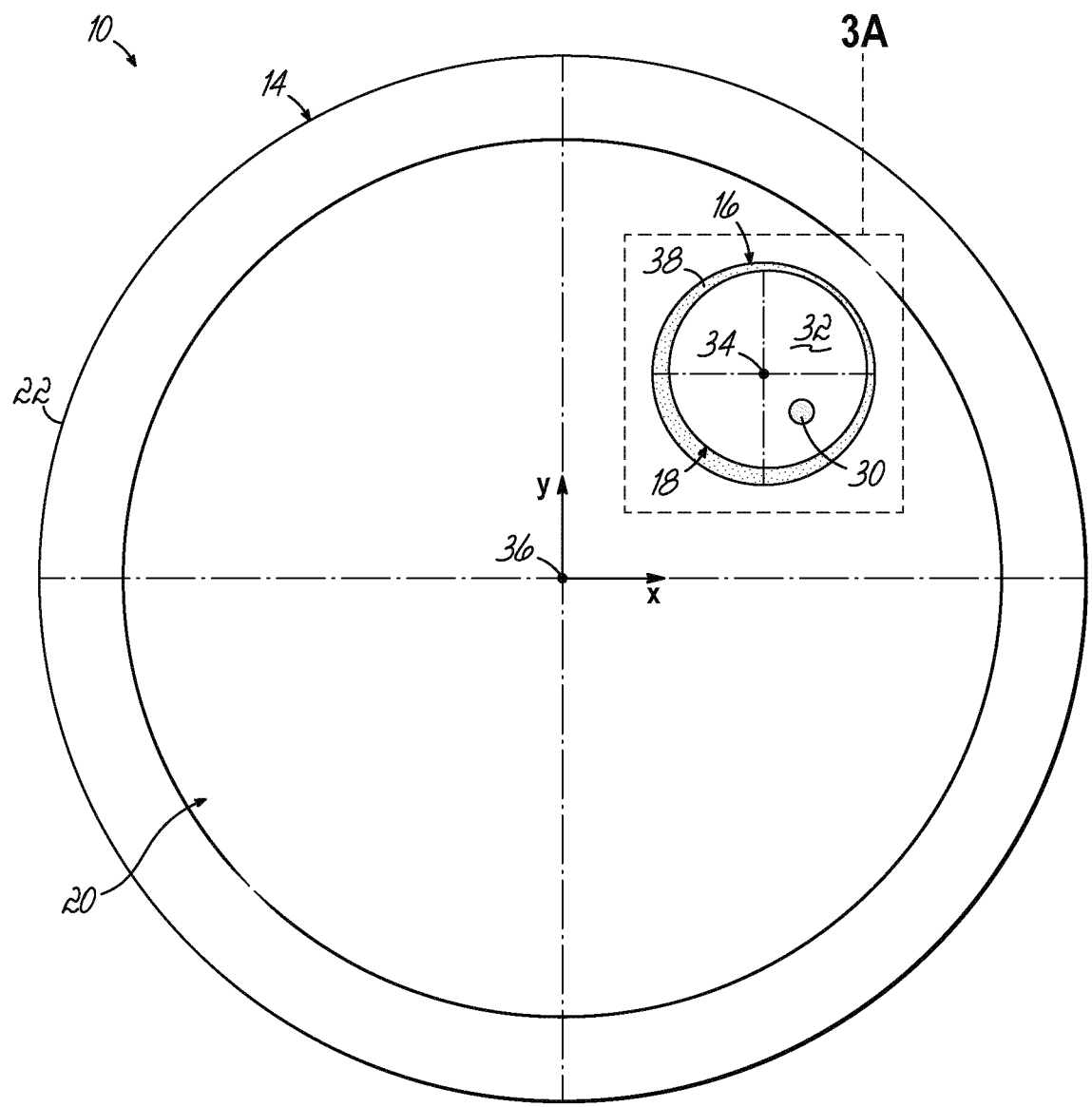
FIG. 3 is a schematic illustration of a typical end face of a ferrule of the fiber optic connector of FIG. 1 having an optical fiber positioned in a micro-bore of the ferrule.
Figure 3A:
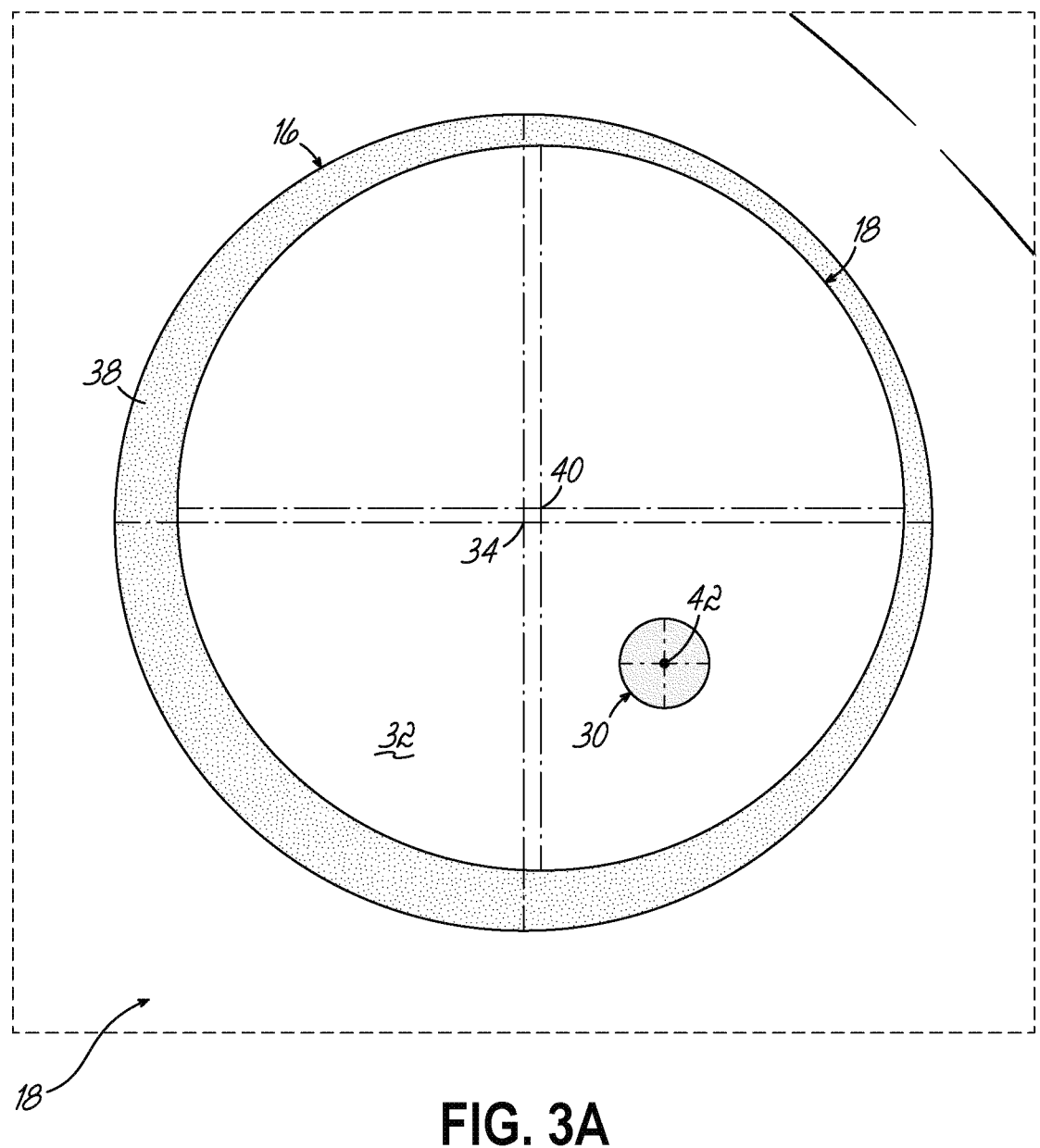
FIG. 3A is an enlarged schematic illustration of the area 3A shown in FIG. 3.

The profile images 201, 202 captured by the apex imagers 66, 68 may include a portion 212, 214 of the silhouetted profile of the ferrule 14. Each profile imaging module 54 may be configured so that its portion 212, 214 of the silhouetted profile corresponds to a respective portion of ferrule 14 where the end-face 20 meets the outer surface 22. As a result, each profile image 201, 202 may include a plurality of image elements in the form of edges 216-221. In the exemplary profile images 201, 202, edges 216, 217 may correspond to the end-face 20, and edges 218, 219 may correspond to apexes of the outer surface 22 on opposite sides of the ferrule 14. In cases where the ferrule 14 includes a chamfer connecting the end-face 20 to the outer surface 22 (such as depicted in FIGS. 1 and 2), the profile images 201, 202 may include additional edges 220, 221 associated with the chamfer.

Because the profile edges 216-221 define outer boundaries of the ferrule 14, their location in the profile images 201, 202 may be used to align the ferrule 14 with and along the z-axis. This physical alignment may position the ferrule 14 so that its center axis 24 is orthogonal to and generally centered in each optical path 80. Thus, each apex edge 218, 219 of a profile image 201, 202 may be analogous to one jaw of an "optical collet" that centers the ferrule 14 along the z-axis of the measurement system 44. Alignment along the z-axis may be obtained using the edges 216, 217 generated by the end-face 20. The location of the edges 216-221 may be recorded using pixel coordinates of each pixel that is considered as part of the edge, and used as a reference (e.g., a fiducial marker) for later measurements, such as comparisons with another ferrule.

The image 200 captured by the core imager 58 may include (e.g., be generally centered on) the core 30 of optical fiber 18 as seen from the end-face 20 of ferrule 14. Because light is fed into the optical fiber 18 while images are captured by the core imager 58, the core 30 may appear as an image element in the form of a circular disk 222 against a dark background in the core image 200. The location, size, and light distribution of the core 30 may also be recorded using pixel coordinates of the image sensor, and used as a reference for later measurements, e.g., for comparisons with another ferrule. The distribution of the light output by the core 30 may be similar to a Gaussian distribution. Accordingly, the radiance measured by the pixels comprising the circular disk 222 and surrounding areas of the core image 200 may also have a Gaussian-like distribution.

Figure 13:
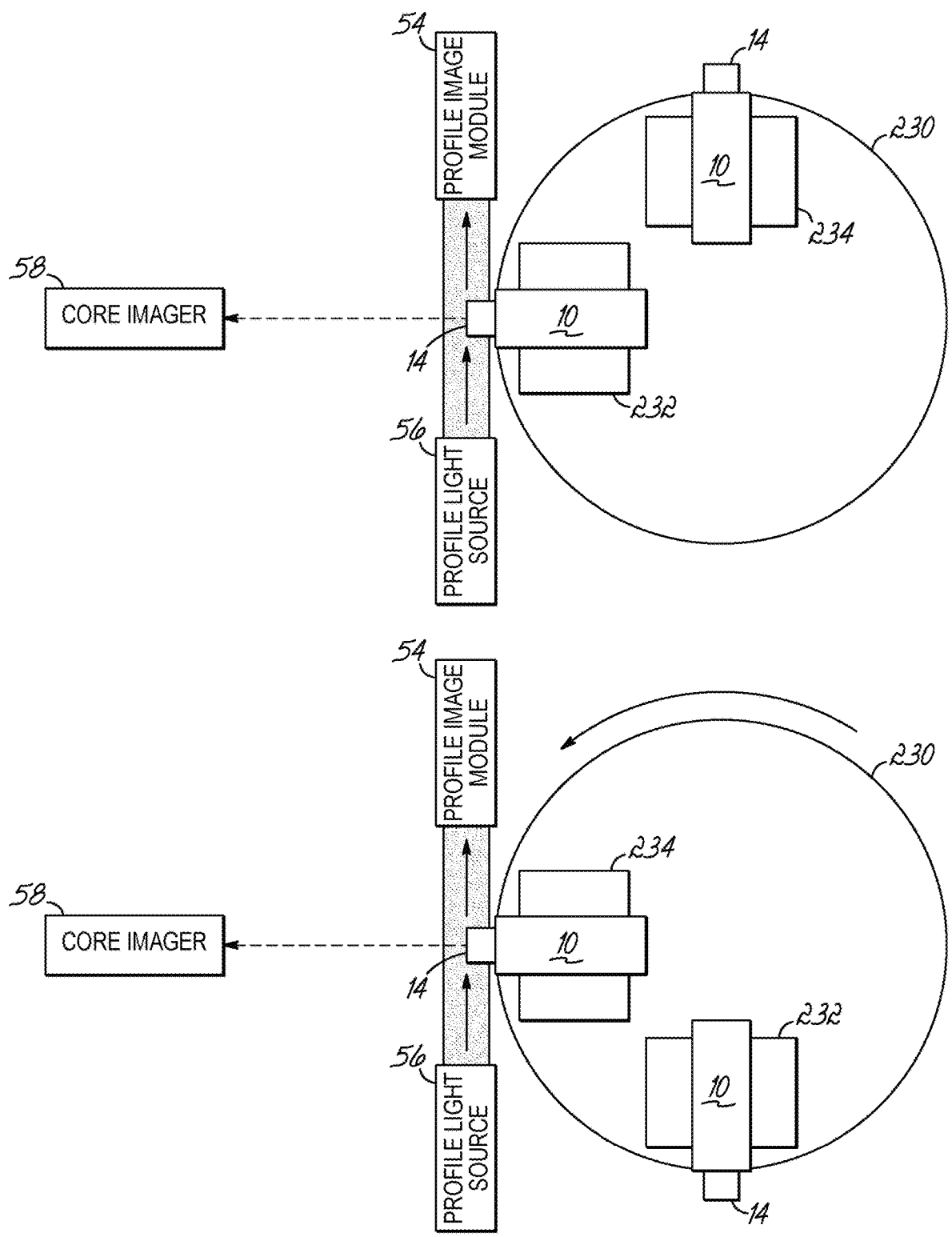
FIG. 13 is a diagrammatic view of a fixture that may be used to selectively position reference and test ferrules in a measurement region of the measurement system of FIG. 1.

FIG. 13 depicts an exemplary fixture 230 that may be used to move ferrules 14 into and out of the measurement region 82. The fixture 230 may include a plurality of measurement ports (e.g., two measurement ports 232, 234) each configured to receive a connector 10 including a ferrule 14. Moving (e.g., rotating) the fixture 230 may alternately place one or another ferrule 14 (e.g., the ferrule 14 of the reference device or the device under test) in the measurement region 82 of measurement system 44. Alternative embodiments may include fixtures (not shown) configured to receive connector sub-assemblies, such as ferrule assemblies only including a respective optical fiber terminated by a respective ferrule (and optionally a ferrule holder that is received over a rear portion of the ferrule).

Figure 14:
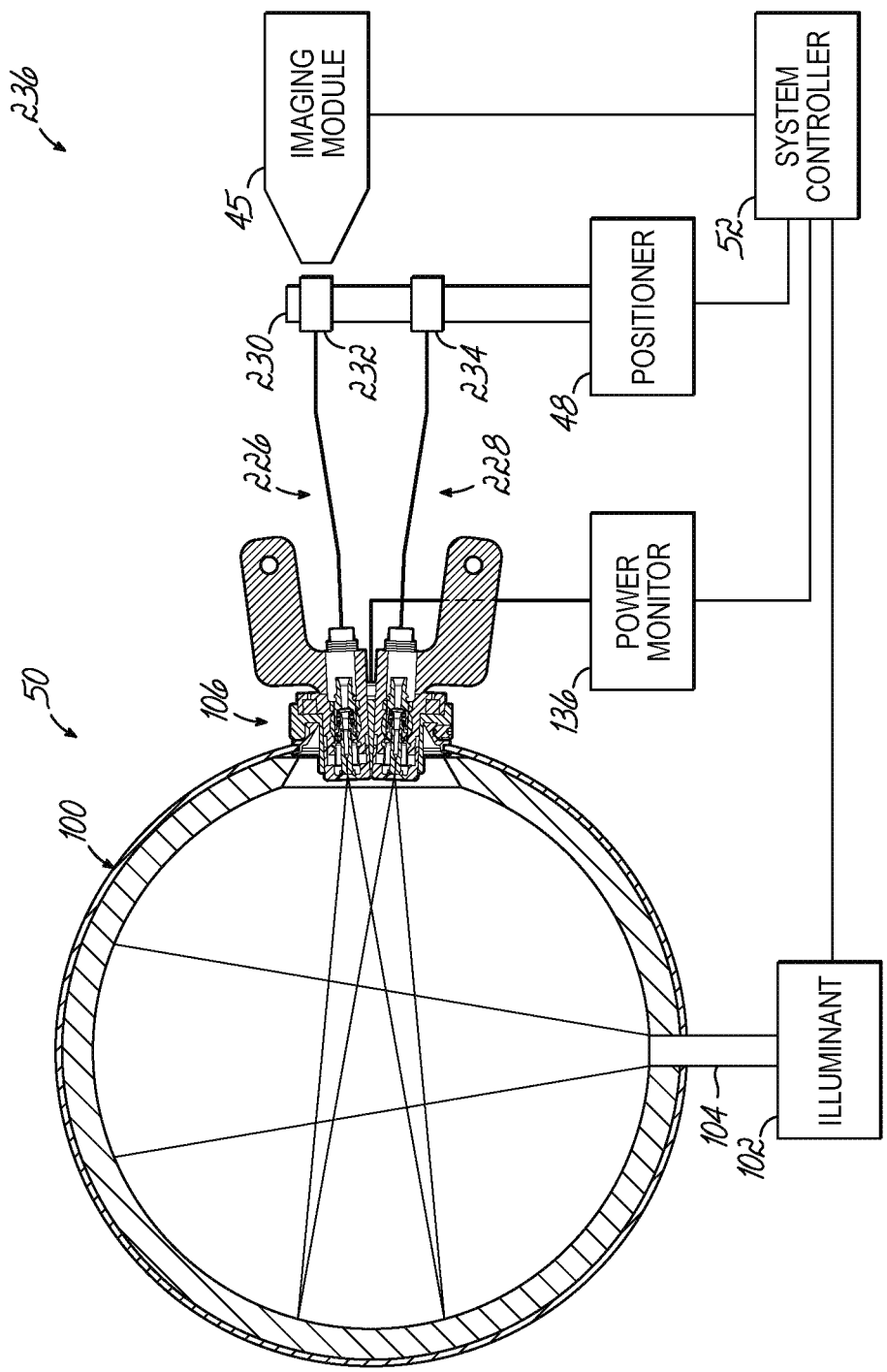
FIGS. 14 and 15 are schematic views of an exemplary test setup that may be used to test fiber optic cables.
Figure 15:
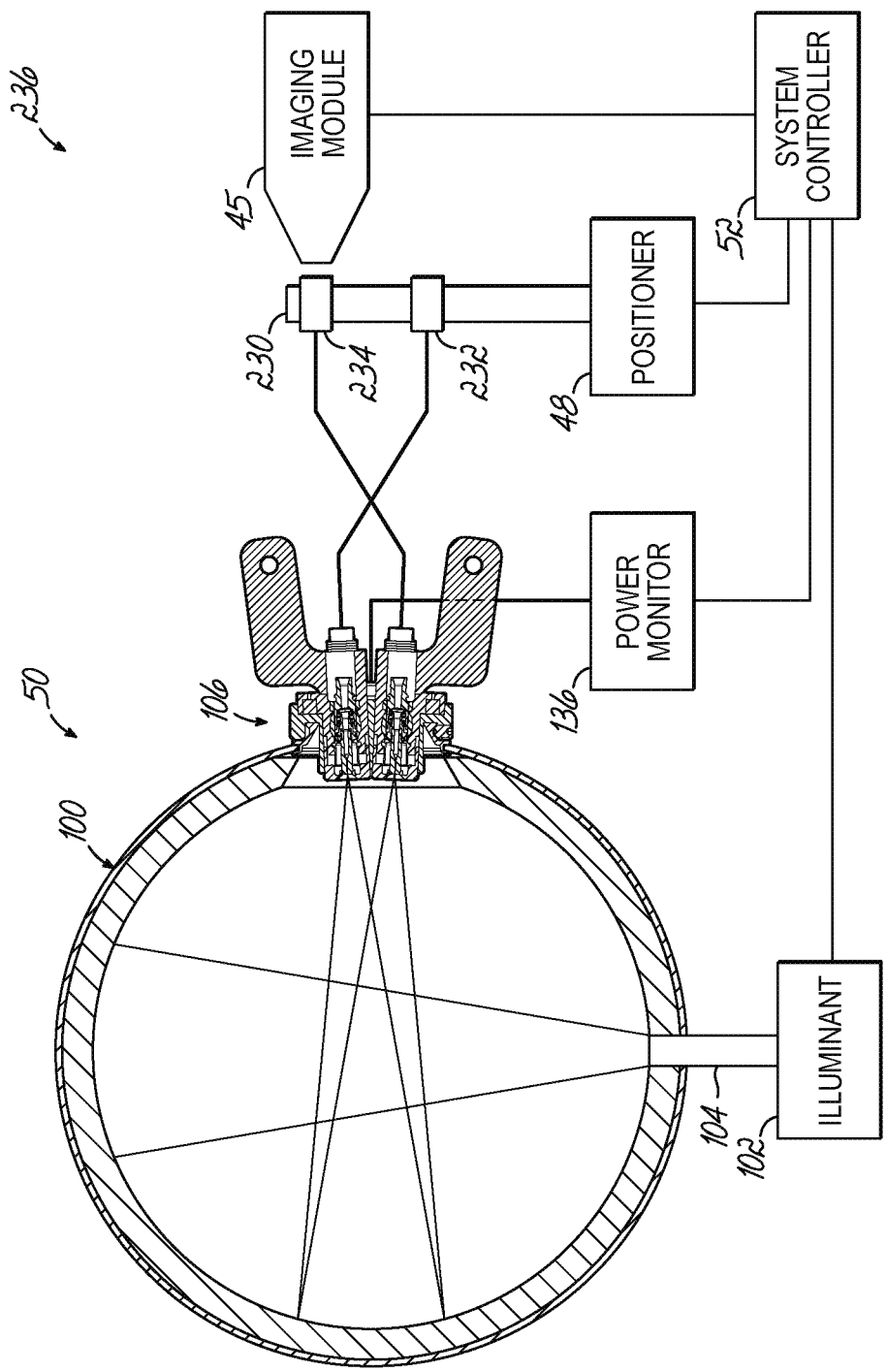

FIGS. 14 and 15 depict an exemplary test setup 236 including the imaging unit 45, positioner 48, diffuse light source 50, system controller 52, power monitor 136, a device under test 226, a reference device 228, and fixture 230. The tail-ends of the device under test 226 and reference device 228 may be operatively coupled to the output port assembly 106 of diffuse light source 50. The head-ends of the device under test 226 and reference device 228 may be operatively coupled to respective measurement ports 232, 234 of fixture 230. The fixture 230 may be operatively coupled to the positioner 48 so that each head-end can be selectively positioned and aligned in the measurement region 82 of the imaging unit 45.

Figure 16:
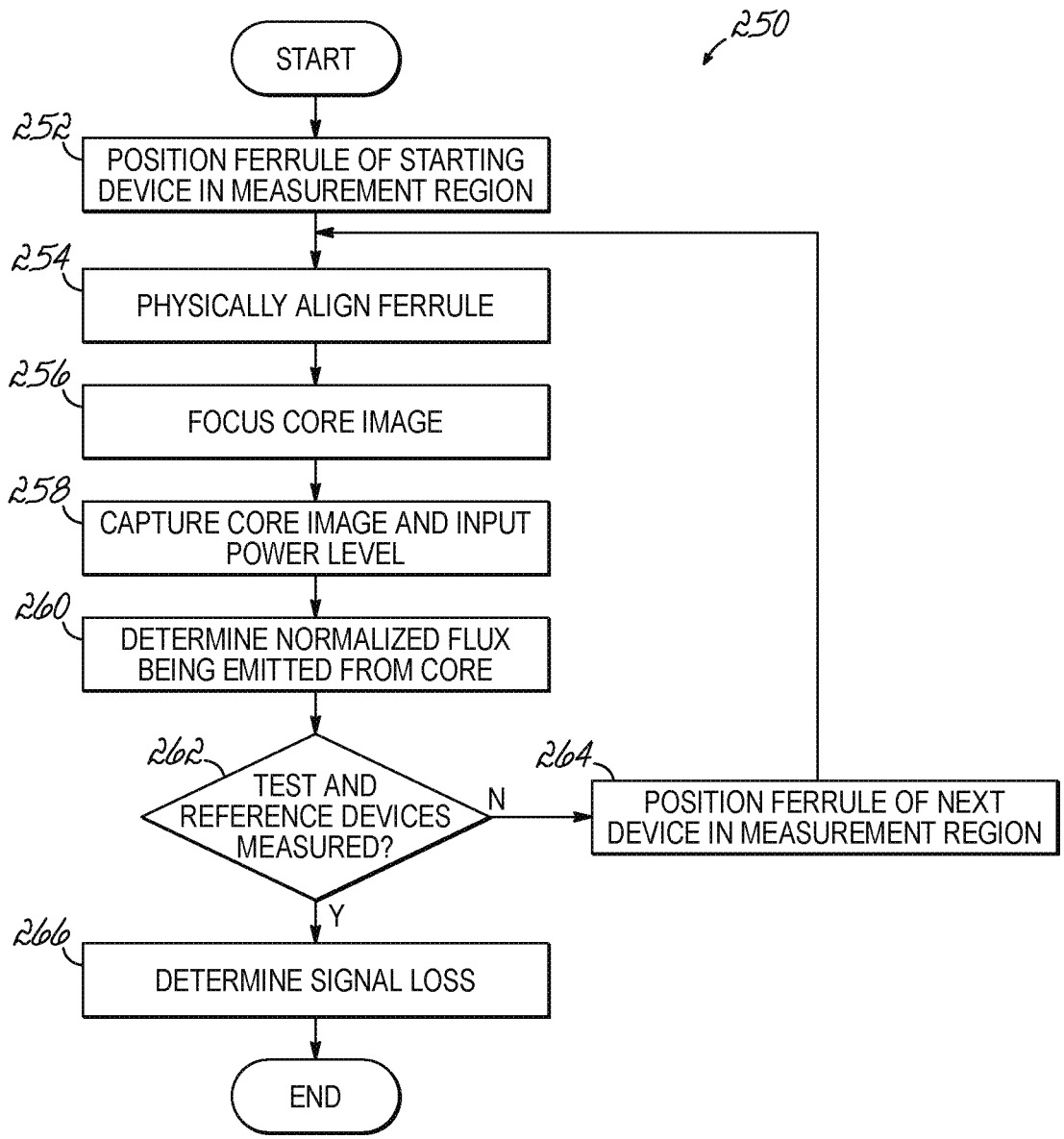
FIG. 16 is a flow chart of a process that may be used to determine the signal loss of a test fiber optic cable based on a reference fiber optic cable having known characteristics.

FIG. 16 depicts a flowchart illustrating a process 250 that may be executed using an exemplary embodiment of the test setup 236 depicted in FIGS. 14 and 15. In block 252, the process 250 may position a ferrule 14 of a starting device (e.g., a ferrule 14 of one of the reference device or the device under test) in the measurement region 82, e.g., as depicted by FIG. 5.

In response to receiving an indication the ferrule 14 is positioned in the measurement region 82 (e.g., based on data received from a bar code scanner, a user interface of a computing device, etc.), the process 250 may proceed to block 254 and physically align the ferrule 14. To this end, the process 250 may receive core and profile images 200-202 of the ferrule and identify image elements 216-222 therein. The process 250 may then compare characteristics of the image elements 216-222 (e.g., their locations) to a reference set of image elements. Based on these comparisons, the process 250 may determine how to reposition the ferrule 14. Physical alignment may be iterative, with new images 200-202 being captured after each re-positioning of the ferrule 14.

By way of example, the locations of the profile edges 216-221 may be compared to a set of fiducial markers. Each fiducial marker may be defined by a predetermined set of pixel coordinates (e.g., for an initial alignment with the measurement system 44), or by pixel coordinates associated with previously identified profile edges (e.g., for comparisons between multiple sets of images of the ferrule). Analysis of core images 200 may include a number of fit parameters, such as core-to-ferrule offset, core light intensity amplitude, the position of the core in the core image (in x-y pixel coordinates), width of the core (e.g., measured along x and y-axes), and ferrule rotation angle γ about the z-axis, i.e., in the x-y plane.

Edge detection may include convolution of the image 200-202 with a derivative of a Gaussian function to provide a smooth derivative of the image 200-202. The smoothness of the image 200-202 may also be provided, at least in part, by adjusting the numerical aperture NA of the imaging system in question. In any case, the resulting distribution of edge illuminance across the derivative of the image 200-202 may enable the location of edges 216-221 to be determined to sub-pixel resolution. For example, the edge location may be indicated by a point on the derivative of the image having a maximum value. The location of this peak value may indicate where the image intensity gradient is at a local maximum. By defining the point of transition from bright to dark pixels, the peak value of the derivative of the image may provide the precise location of the edge 216-221 in the image 201, 202.

In response to identifying a misalignment between the profile edges 216-221 and the fiducial markers, the process 250 may cause the positioner 48 to move the ferrule 14 in a manner that reduces the misalignment. As part of the physical alignment in block 254, the process 250 may adjust the position of the ferrule 14 along the z-axis to align profile edges associated with the end-face 20 with fiducial markers, as well as to obtain a rough focus of the circular disk 222 in the core image 200.

Physical alignment of the ferrule may include moving and rotating the ferrule 14 in a six-degree of movement reference frame (x, y, z, α, β, γ) until the profile edges are aligned with certain regions, pixels, or other fiducial markers in the profile images. An edge may be considered aligned with a fiducial marker when it is within a predetermined distance and has a slope within a predetermined angle of the fiducial marker. In cases where the radius of the ferrule is larger or smaller than expected, profile edges may be aligned with their respective fluidical markers such that the offset is evenly distributed between each side of the ferrule.

In response to determining that the ferrule 14 has been sufficiently aligned with the measurement system 44 (e.g., within 500 nm in each linear dimension (x, y, z), and within 20 Arad angular alignment in each angular dimension (α, β, γ)), the process 250 may proceed to block 256 and obtain a final focus of the core image 200. Final focusing of the core image 200 may include adjusting the core imaging objective 74 of core imager 58 to achieve a best-focus of the circular disk 222 in the core image 200. Best-focus may be achieved, for example, when the diameter of the circular disk 222 is at a minimum.

Once the core image is focused, the process 250 may proceed to block 258. In block 258, the process 250 may capture one or more core images 200 from the core imager 58 and one or more gated input power level measurements from the power monitor 136. Each core image 200 may be captured simultaneously, or nearly simultaneously (e.g., within 0.001 second) with the gated input power level measurement. The exposure time for the core image 200 may also be matched to that of the sensor of power monitor 136 so that radiance measurements are acquired over the same period of time in order to improve the correlation between core image brightness and measured input power.

In block 260, the process 250 may determine a normalized flux value $\phi_N$ that is proportional to the radiant flux being emitted from the core 30 at the head-end of the optical fiber 18. Each pixel of the circular disk 222 may have a value proportional to the radiance of the portion of the core 30 corresponding to that pixel. The value of each pixel may be, for example, between 0 and $N_{MAX}$, where $N_{MAX}=2^B-1$ and B is the number of bits in the binary number representing the radiance of the pixel. To ensure accurate measurements, the aperture, exposure time, and sensitivity of the core imager 58 may be set to avoid saturating the pixels representing the circular disk 222, e.g., so that each pixel has a value below $N_{MAX}$. Thus, if a core image 200 has an excessive number of pixels having a value at or near $N_{MAX}$, the process 250 may adjust the exposure downward and capture another core image 200. On the other hand, if the values of the pixels comprising the circular disk 222 of core image 200 are below a certain threshold (e.g., less than $(N_{MAX})/2$), the process 250 may adjust the exposure upward and capture another core image 200.

A core flux value $\phi_{CORE}$ proportional to the total flux emitted by the core 30 may be determined based on a sum of the radiance values of the pixels comprising the circular disk 222. In an alternative embodiment, a Gaussian curve may be fitted to the pixel values of the circular disk 222, and the core flux value $\phi_{CORE}$ determined by computing the area under the fitted Gaussian curve. In any case, the core flux value $\phi_{CORE}$ may be normalized by dividing the core flux value $\phi_{CORE}$ by the gated power level measurement $\phi_{PM}$ received from the power monitor 136 to produce a normalized core flux value $\phi_N$ as shown below:

$$\phi_N = \frac{\phi_{CORE}}{\phi_{PM}}$$

In block 262, the process 250 may determine if the normalized core flux value $\phi_N$ has been determined for each of the devices being measured, e.g., the reference device and the device under test. If only one of the devices has been measured ("NO" branch of decision block 262), the process 250 may proceed to block 264. In block 264, the process 250 may position the ferrule 14 of the next device to be measured in the measurement region 82, e.g., as depicted by FIG. 15. In an alternative embodiment, the process 250 may wait for an indication that the next ferrule 14 is in position, such as input from the system operator. In any case, in response to the next ferrule 14 being in position, the process may return to block 254 and repeat the transmission measurements on the next device.

If both the reference device and the device under test have been measured ("YES" branch of decision block 262), the process 250 may proceed to block 266, and determine the relative signal loss of the device under test. This determination may include dividing the normalized flux of the device under test $\phi_{N\_DUT}$ by the normalized flux of the reference device $\phi_{N\_REF}$. The relative signal loss in dB may be provided by the exemplary equation:

$$10 \times \log\left(\frac{\phi_{N\_DUT}}{\phi_{N\_REF}}\right)$$

The transmission loss of the reference device and the device under test may be measured sequentially by repositioning their respective connectors 10 in the measurement region 82 of measurement system 44, The highly diffuse and uniform nature of the light provided by the diffuse light source 50 may avoid the need to align the tail-ends of the reference and test devices, thereby improving the speed and convenience of the measurement process.

Figure 17:
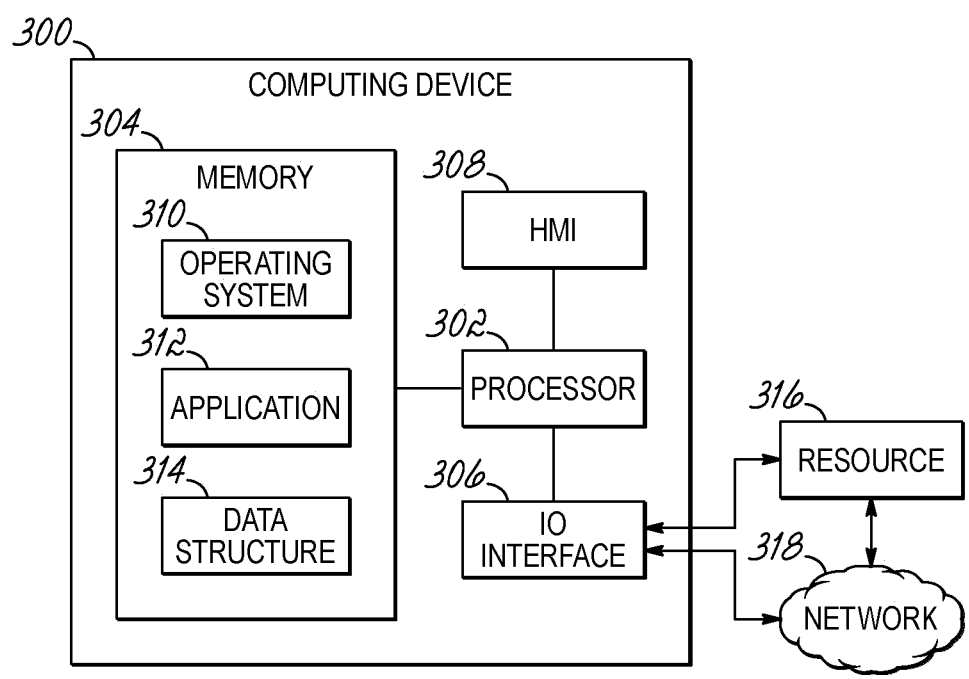
FIG. 17 is a schematic view of an exemplary computer that may be used to implement one or more of the features and attributes of FIGS. 1-16.

Referring now to FIG. 17, various features and attributes described herein may be implemented using one or more computer devices or systems, such as exemplary computer 300. The computer 300 may include a processor 302, a memory 304, an input/output (I/O) interface 306, and a Human Machine Interface (HMI) 308. The processor 302 may include one or more devices that manipulate signals or data based on operational instructions stored in memory 304. Memory 304 may include a one or more devices configured to store information in the form of digital data.

The processor 302 may operate under the control of an operating system 310 that resides in memory 304. The operating system 310 may manage computer resources so that computer program code embodied as one or more computer software applications 312 residing in memory 304 can have instructions executed by the processor 302. One or more data structures 314 may also reside in memory 304, and may be used by the processor 302, operating system 310, or application 312 to store or manipulate data.

The I/O interface 306 may provide a machine interface that operatively couples the processor 302 to other devices and systems, such as the positioner 48, diffuse light source 50, profile light sources 56, core imager 58, profile imaging objective assembly 60, apex imagers 66, 68, core imaging objective assembly 72, and power monitor 136. The application 312 may thereby work cooperatively with the other devices and systems by communicating via the I/O interface 306 to provide any of the features described herein or their equivalents. The application 312 may also have program code that is executed by one or more external resources, or otherwise rely on functions or signals provided by other system or network components external to the system 44. Indeed, given the nearly endless hardware and software configurations possible, persons having ordinary skill in the art will understand that embodiments may include applications that are located externally to the computer 300, distributed among multiple computers or other external resources, or provided by computing resources (hardware and software) that are provided as a service over a network, such as a cloud computing service.

The HMI 308 may be operatively coupled to the processor 302 to allow a user to interact directly with the computer 300. The HMI 308 may include video or alphanumeric displays, a touch screen, a speaker, and any other suitable audio and visual indicators capable of providing data to the user. The HMI 308 may also include input devices and controls such as an alphanumeric keyboard, a pointing device, keypads, pushbuttons, control knobs, microphones, etc., capable of accepting commands or input from the user and transmitting the entered input to the processor 302.

The computer 300 may also be operatively coupled to one or more external resources 316, e.g., via a communication network 318. External resources may include, but are not limited to, servers, databases, mass storage devices, peripheral devices, cloud-based network services, or any other resource that may be used by the computer 300 to implement any of the features described herein or their equivalents.

In general, the routines executed to implement the features and attributes described herein, or their equivalents, may be referred to as "computer program code," or simply "program code." Program code typically comprises computer-readable instructions that are resident at various times in various memory and storage devices in a computer and that, when read and executed by one or more processors in a computer, cause that computer to perform the operations necessary to execute the various features and attributes of the described embodiments. Computer-readable program instructions for carrying out these operations may be, for example, assembly language, source code, or object code written in any combination of one or more programming languages. Program code is capable of being individually or collectively distributed as a computer program product in a variety of different forms. In particular, program code may be distributed using a computer-readable storage medium having computer-readable program instructions thereon for causing a processor to carry out aspects of the features and attributes described herein.

Computer-readable storage media, which is inherently non-transitory, may include volatile and non-volatile, and removable and non-removable tangible media implemented in any method or technology for storage of data, such as computer-readable instructions, data structures, program modules, or other data. A computer-readable storage medium should not be construed as transitory signals per se (e.g., radio waves or other propagating electromagnetic signals). Computer-readable program instructions may be downloaded to a computer, another type of programmable data processing apparatus, or another device from a computer-readable storage medium or to an external computer or external storage device via a network.

The flowcharts and block diagrams depicted in the figures illustrate features and attributes of possible implementations of systems, methods, or computer program products according to various disclosed embodiments and their equivalents. In this regard, each block in a flowchart or block diagram may represent a module, segment, or portion of instructions, which comprises one or more executable instructions for implementing the specified logical function or functions. In certain alternative embodiments, the functions or operations specified in the text or drawings of the specification may be re-ordered, processed serially, or processed concurrently consistent with embodiments thereof. Moreover, any of the flowcharts or block diagrams may include more or fewer blocks than those illustrated consistent with embodiments thereof. It should also be understood that each block of the block diagrams or flowcharts, or any combination of blocks in the block diagrams or flowcharts, may be implemented by a special purpose hardware-based system configured to perform the specified functions, or carried out by a combination of special purpose hardware and computer instructions.

The terminology used herein is for the purpose of describing particular embodiments only and is not intended to be limiting of other embodiments. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, but do not preclude the presence or addition of one or more other features, or groups thereof. Furthermore, to the extent that the terms "includes", "having", "has", "with", "comprised of", or variants thereof are used in either the detailed description or the claims, such terms are intended to be inclusive in a manner similar to the term "comprising".

While the present disclosure includes the description of specific embodiments, and while these embodiments have been described in considerable detail, it is not intended to restrict or in any way limit the scope of the appended claims to such detail. The various features discussed herein may be used alone or in any combination within and between the various embodiments. Additional advantages and modifications will readily appear to those skilled in the art. The claims in their broader aspects are therefore not limited to the specific details, representative apparatus and methods and illustrative examples shown and described. Accordingly, departures may be made from such details without departing from the scope of the present disclosure.

What is claimed is:

1. A method of measuring signal loss in a fiber optic cable, comprising:
   positioning a reference head-end of a reference fiber optic cable in a measurement region;
   illuminating a reference tail-end of the reference fiber optic cable with a diffuse light;
   determining a reference radiant flux being emitted from the reference head-end of the reference fiber optic cable;
   positioning a test head-end of a test fiber optic cable in the measurement region;
   illuminating a test tail-end of the test fiber optic cable with the diffuse light;
   determining a test radiant flux emitted from the test head-end of the test fiber optic cable; and
   determining a signal loss of the test fiber optic cable by comparing the test radiant flux to the reference radiant flux;
   wherein illuminating the reference tail-end and the test tail-end comprises:

emitting light into an integrating chamber that includes an inner surface having a first target area and a second target area, wherein the first target area is offset from the second target area, and the light is emitted toward the first target area;

aiming the reference tail-end toward the second target area of the inner surface of the integrating chamber; and aiming the test tail-end toward the second target area of the inner surface of the integrating chamber; and wherein the light emitted into the integrating chamber is provided by a laser including a single mode having a dithered phase, a plurality of modes having non-dithered phases, a plurality of modes having dithered phases, or a plurality of modes shifted spatially.

2. The method of claim 1, wherein positioning a respective head-end of the reference head-end and the test head-end comprises:

capturing a plurality of profile images of a ferrule of the respective head-end, each profile image including an image element corresponding to an outer surface of the ferrule; and positioning the respective head-end so that the image element in each of the plurality of profile images aligns with a fiducial marker associated with the profile image.

3. The method of claim 1, further comprising:

aiming a power monitor tail-end of a power monitor fiber optic cable toward the second target area;

illuminating the power monitor tail-end of the power monitor fiber optic cable with the diffuse light;

determining a power monitor radiant flux emitted from a power monitor head-end of the power monitor fiber optic cable; and normalizing at least one of the test radiant flux and the reference radiant flux based on the power monitor radiant flux.

4. The method of claim 1, wherein measuring a respective radiant flux of the reference radiant flux and the test radiant flux comprises:

capturing a core image of a respective head-end of a respective fiber optic cable of the reference fiber optic cable and the test fiber optic cable, wherein the core image includes an image element associated with a core of the respective fiber optic cable; and determining the respective radiant flux based on the image element.

5. The method of claim 4, wherein:

the image element includes one or more pixels each having a pixel value proportional to a radiance of a portion of the core associated with the pixel, and determining the respective radiant flux based on the image element includes summing the one or more pixel values.

6. The method of claim 4, wherein the image element includes one or more pixels each having a pixel value proportional to a radiance of a portion of the core associated with the pixel, and determining the respective radiant flux based on the image element includes fitting a Gaussian curve to the one or more pixel values and computing an area under the Gaussian curve.

7. The method of claim 1, wherein the test head-end comprises a fiber optic connector that includes a ferrule and a connector housing that receives the ferrule, and wherein the ferrule is biased relative to the connector housing to an extended position, the method further comprising:

moving the ferrule of the test head-end relative to the connector housing so that the ferrule is in a retracted position; and determining the test radiant flux emitted from the test head-end of the test fiber optic cable while the ferrule is in the retracted position.

8. The method of claim 7, further comprising:

comparing the test radiant flux emitted from the test head-end while the ferrule is in the retracted position to the test radiant flux emitted from the test head-end while the ferrule is in an extended position; and determining that a defect exists in the test fiber optic cable if a difference in the test radiant flux between the retracted position and the extended position exceeds a predetermined threshold.

9. A system for measuring a signal loss in a test fiber optic cable including a test tail-end and a test head-end, comprising:

a reference fiber optic cable including a reference tail-end and a reference head-end;

a diffuse light source configured to provide a diffuse light to the reference tail-end of the reference fiber optic cable and to the test tail-end of the test fiber optic cable;

a core imager configured to capture a reference core image of the reference head-end and a test core image of the test head-end;

one or more processors in communication with the core imager;

a plurality of apex imagers in communication with the one or more processors and arranged so that each apex imager captures a profile image from a different angle around a measurement region;

a positioner in communication with the one or more processors; and a memory coupled to the one or more processors and including program code that, when executed by the one or more processors, causes the system to:

determine a reference radiant flux emitted by the reference head-end based on the reference core image;

determine a test radiant flux emitted by the test head-end based on the test core image; and determine the signal loss of the test fiber optic cable by comparing the test radiant flux to the reference radiant flux;

wherein the program code further causes the system to, for a respective head-end of the reference head-end and the test head-end:

capture a plurality of profile images of a ferrule of the respective head-end, each profile image of the plurality of profile images including an image element corresponding to an outer surface of the ferrule; and position the respective head-end so that the image element in each profile image of the plurality of profile images aligns with a fiducial marker associated with the profile image.

10. The system of claim 9, wherein the diffuse light source comprises:

an integrating chamber that includes an inner surface having a first target area and a second target area offset from the first target area;

an illuminant that emits light toward the first target area; and an output port assembly configured to:

receive the reference head-end of the reference fiber optic cable and the test head-end of the test fiber optic cable; and orient the reference head-end of the reference fiber optic cable and the test head-end of the test fiber optic cable so that they are aimed at the second target area.

11. The system of claim 10, further comprising:
a power monitor in communication with the one or more processors; and
a power monitor fiber optic cable that includes a power monitor head-end and a power monitor tail-end and that operatively couples the power monitor to the integrating chamber,
wherein the output port assembly is further configured to orient the power monitor tail-end so that the power monitor tail-end is aimed at the second target area, and
wherein the program code further causes the system to:
determine a power monitor radiant flux emitted from the power monitor head-end, and
normalize at least one of the test radiant flux and the reference radiant flux based on the power monitor radiant flux.

12. The system of claim 10, wherein the illuminant comprises:
a laser including a single mode having a dithered phase, a plurality of modes having non-dithered phases, or a plurality of modes having dithered phases.

13. The system of claim 10, wherein the output port assembly comprises:
a first receiver assembly configured to receive one of the reference head-end of the reference fiber optic cable or the test head-end of the test fiber optic cable;
a second receiver assembly configured to receive the other of the reference head-end of the reference fiber optic cable or the test head-end of the test fiber optic cable; and
a port adapter operatively coupled to the integrating chamber and including a first receptacle and a second receptacle each configured to receive one of the first receiver assembly and the second receiver assembly.

14. The system of claim 13, wherein each of the first receiver assembly and the second receiver assembly includes:
a receiver body configured to receive a respective head-end of the reference fiber optic cable or the test fiber optic cable, and
a compression cap that is operatively coupled to the receiver body by a retaining bolt,
wherein the compression cap is configured to compress a ferrule of the respective head-end in response to the retaining bolt being tightened.

15. The system of claim 13, wherein:
each of the first receiver assembly and the second receiver assembly includes a receiver body configured to receive one of the reference head-end of the reference fiber optic cable or the test head-end of the test fiber optic cable,
the receiver body includes a flange having a magnet, and
each of the first receptacle and the second receptacle of the port adapter includes a stop face configured to engage the flange of the receiver body and that is attracted to the magnet.

16. The system of claim 10, wherein:
the inner surface of the integrating chamber comprises a fluorescent material that emits light over a continuum of wavelengths, and
the light emitted by the illuminant has a wavelength that is outside the continuum of wavelengths emitted by the fluorescent material and that excites the fluorescent material.

17. The system of claim 9, wherein the program code causes the system to measure a respective radiant flux of the reference radiant flux and the test radiant flux by:
capturing a core image of a respective head-end of the reference fiber optic cable and the test fiber optic cable, wherein the core image includes an image element associated with a core of the respective head-end; and
determine the respective radiant flux based on the image element.

18. A method of measuring signal loss in a fiber optic cable, comprising:
positioning a reference head-end of a reference fiber optic cable in a measurement region;
illuminating a reference tail-end of the reference fiber optic cable with a diffuse light;
determining a reference radiant flux being emitted from the reference head-end of the reference fiber optic cable;
positioning a test head-end of a test fiber optic cable in the measurement region, wherein the test head-end comprises a fiber optic connector that includes a ferrule and a connector housing that receives the ferrule, and wherein the ferrule is biased relative to the connector housing to an extended position;
illuminating a test tail-end of the test fiber optic cable with the diffuse light;
determining a test radiant flux emitted from the test head-end of the test fiber optic cable when the ferrule is in the extended position; and
determining a signal loss of the test fiber optic cable by comparing the test radiant flux to the reference radiant flux;
wherein the method further comprises:
moving the ferrule of the test head-end relative to the connector housing so that the ferrule is in a retracted position;
determining the test radiant flux emitted from the test head-end of the test fiber optic cable while the ferrule is in the retracted position;
comparing the test radiant flux emitted from the test head-end while the ferrule is in the retracted position to the test radiant flux emitted from the test head-end while the ferrule is in an extended position; and
determining that a defect exists in the test fiber optic cable if a difference in the test radiant flux between the retracted position and the extended position exceeds a predetermined threshold.

* * * * *